(12) United States Patent
Crump et al.

(10) Patent No.: US 6,892,245 B1
(45) Date of Patent: May 10, 2005

(54) MANAGEMENT INFORMATION BASE FOR A MULTI-DOMAIN NETWORK ADDRESS TRANSLATOR

(75) Inventors: Richard Crump, Boston, MA (US); Timothy Cunningham, Groton, MA (US); Joseph Flaherty, Westborough, MA (US); Manish Patel, Tyngsboro, MA (US)

(73) Assignee: Nortel Networks Limited (CA)

( * ) Notice: Subject to any disclaimer, the term of this patent is extended or adjusted under 35 U.S.C. 154(b) by 696 days.

(21) Appl. No.: 09/667,460

(22) Filed: Sep. 22, 2000

(51) Int. Cl.[7] ............................................. G06F 13/00
(52) U.S. Cl. ..................... 709/245; 709/223; 709/238; 709/249
(58) Field of Search ............................... 709/223, 236, 709/238, 245, 249, 250, 230; 370/392, 395.54, 401

(56) References Cited

U.S. PATENT DOCUMENTS

| | | | | |
|---|---|---|---|---|
| 5,493,607 A | * | 2/1996 | Arumainayagam et al. | 379/88.18 |
| 6,052,683 A | * | 4/2000 | Irwin | 707/8 |
| 6,243,383 B1 | * | 6/2001 | Li et al. | 370/395.6 |
| 6,331,984 B1 | * | 12/2001 | Luciani | 370/401 |
| 6,442,602 B1 | * | 8/2002 | Choudhry | 709/218 |
| 6,501,767 B1 | * | 12/2002 | Inoue et al. | 370/465 |
| 6,535,511 B1 | * | 3/2003 | Rao | 370/392 |
| 6,578,021 B1 | * | 6/2003 | Barillaud | 706/20 |
| 6,581,108 B1 | * | 6/2003 | Denison et al. | 709/245 |

OTHER PUBLICATIONS

Egevang et al., Internet Engineering Task Force (IETF) Request for Comments (RFC) 1631 entitled "The IP Network Address Translator (NAT)" May 1994.

* cited by examiner

*Primary Examiner*—Viet D. Vu
(74) *Attorney, Agent, or Firm*—Steubing McGuinness & Manaras LLP

(57) ABSTRACT

A management information base (MIB) for a multi-domain network address translator provides management objects for configuring and controlling the multi-domain network address translator. The MIB includes management objects for defining a domain-specific source address filter range, which is a range of addresses used to detect domain-specific packets that require domain-specific network address translation forwarding. The domain-specific source address filter management objects include a beginning address, a prefix length, a domain indicator, and a domain-specific translation pool indicator. The MIB also includes management objects for defining a domain-specific translation pool, which is a range of addresses from which domain-specific translation addresses are selected for domain-specific network address translation forwarding. The domain-specific translation pool management objects include a beginning address, a prefix length, and a domain indicator.

45 Claims, 38 Drawing Sheets

| Source Local Address | Protocol | Source Port | Source Address Domain | Destination Address Domain | Translated Source Port | Source Global Address |
|---|---|---|---|---|---|---|
| A (host X) | | | 1 | 2 | | A12 |
| A (host X) | | | 1 | 3 | | A13 |
| A (host X) | | | 1 | 4 | | A14 |

FIG. 2A

| Source Local Address | Protocol | Source Port | Source Address Domain | Destination Address Domain | Translated Source Port | Source Global Address |
|---|---|---|---|---|---|---|
| A (host Y) | | | 2 | 1 | | A21 |
| A (host Y) | | | 2 | 3 | | A23 |
| A (host Y) | | | 2 | 4 | | A24 |

FIG. 2B

| Source Local Address | Protocol | Source Port | Source Address Domain | Destination Address Domain | Translated Source Port | Source Global Address |
|---|---|---|---|---|---|---|
| A (host Z) | | | 3 | 1 | | A31 |
| A (host Z) | | | 3 | 2 | | A32 |
| A (host Z) | | | 3 | 4 | | A34 |

FIG. 2C

| Destination Global Address | Protocol | Translated Destination Port | Source Address Domain | Destination Address Domain | Destination Port | Destination Local Address |
|---|---|---|---|---|---|---|
| A12 | | | 2 | 1 | | A (hostX) |
| A13 | | | 3 | 1 | | A (hostX) |
| A14 | | | 4 | 1 | | A (hostX) |
| A21 | | | 1 | 2 | | A (hostY) |
| A23 | | | 3 | 2 | | A (hostY) |
| A24 | | | 4 | 2 | | A (hostY) |
| A31 | | | 1 | 3 | | A (hostZ) |
| A32 | | | 2 | 3 | | A (hostZ) |
| A34 | | | 4 | 3 | | A (hostZ) |
| B | | | 0 | 4 | | B |

FIG. 2D

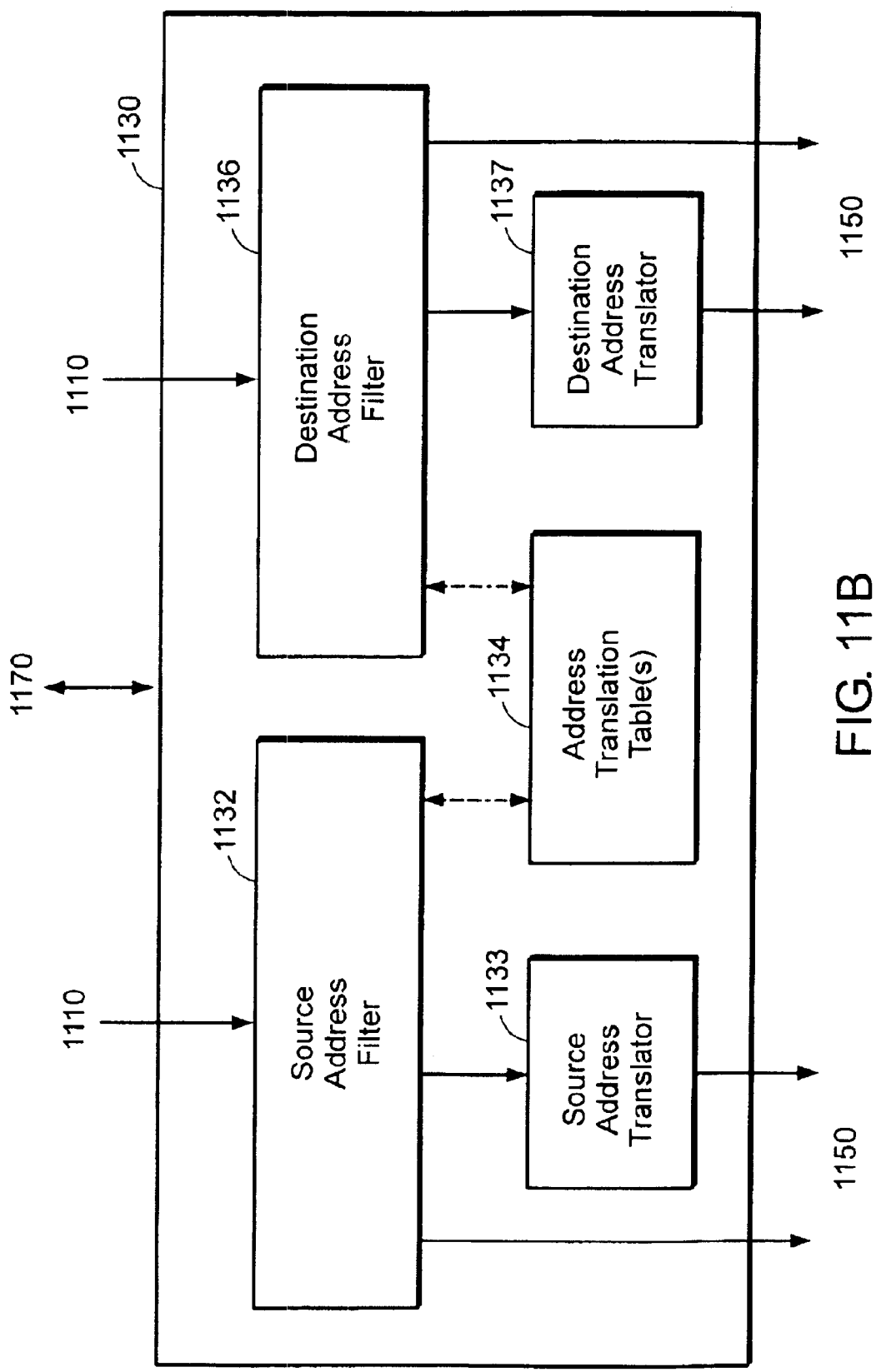

```
Wellfleet-NAT-MIB DEFINITIONS ::= BEGIN

--

IMPORTS

IpAddress, Counter, Gauge
        FROM RFC1155-SMI
    OBJECT-TYPE
        FROM RFC-1212
    DisplayString
        FROM RFC1213-MIB
    wfNatGroup
        FROM Wellfleet-COMMON-MIB;

wfNatIfTable OBJECT-TYPE
    SYNTAX   SEQUENCE OF WfNatIfEntry
    ACCESS   not-accessible
    STATUS   mandatory
    DESCRIPTION
        "The set of interface that are participating
        in the NAT protocol."
    ::= { wfNatGroup 6 } wfNatIfEntry OBJECT-TYPE
    SYNTAX   WfNatIfEntry
    ACCESS   not-accessible
    STATUS   mandatory
    DESCRIPTION
        "An single instance of a NAT interface entry."
    INDEX    { wfNatIfIpAddress,
        wfNatIfCircuit }
    ::= { wfNatIfTable 1 }
```

FIG. 12A

```
WfNatIfEntry ::= SEQUENCE {
    wfNatIfDelete
        INTEGER,
    wfNatIfDisable
        INTEGER,
    wfNatIfIpAddress
        IpAddress,
    wfNatIfCircuit
        INTEGER,
    wfNatIfType
        INTEGER,
    wfNatIfState
        INTEGER,
    wfNatIfTxCount
        Counter,
    wfNatIfRxCount
        Counter,
    wfNatIfPktDropCount
        Counter,
    wfNatIfDomain
        DisplayString
}
```

```
wfNatIfDelete OBJECT-TYPE
   SYNTAX   INTEGER {
       created(1),
       deleted(2)
     }
   ACCESS   read-write
   STATUS   mandatory
   DESCRIPTION
       "This variable determines in a NAT Interface has been
       configured on the router."
   DEFVAL   { created }
   ::= { wfNatIfEntry 1 } wfNatIfDisable OBJECT-TYPE
   SYNTAX   INTEGER {
       enabled(1),
       disabled(2)
     }
   ACCESS   read-write
   STATUS   mandatory
   DESCRIPTION
       "The NAT interface's administrative status. The value
       'enabled' denotes that NAT has been configured
       on the interface. The value 'disabled' denotes that
       the interface is not running NAT."
   DEFVAL   { enabled }
   ::= { wfNatIfEntry 2 }
```

FIG. 12B-2

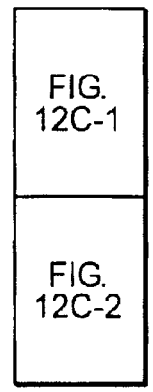

FIG. 12C

```
wfNatIfIpAddress OBJECT-TYPE
    SYNTAX   IpAddress
    ACCESS   read-only
    STATUS   mandatory
    DESCRIPTION
         "The IP address of this NAT interface."
    ::= { wfNatIfEntry 3 } wfNatIfCircuit OBJECT-TYPE
    SYNTAX   INTEGER
    ACCESS   read-write
    STATUS   mandatory
    DESCRIPTION
         "The circuit number of this interface."
    ::= { wfNatIfEntry 4 } wfNatIfType OBJECT-TYPE
    SYNTAX   INTEGER {
         uniDirInbound(1),
         uniDirOutbound(2),
         biDirectional(3)
    }
    ACCESS   read-write
    STATUS   mandatory
    DESCRIPTION
         "Denotes the type of NAT interface being defined."
    DEFVAL{ uniDirInbound }
    ::= { wfNatIfEntry 5 }
```

FIG. 12C-1

```
wfNatIfState OBJECT-TYPE
    SYNTAX   INTEGER {
        up(1),
        down(2),
        init(3)
    }
    ACCESS   read-only
    STATUS   mandatory
    DESCRIPTION
        "The state of NAT on this interface"
    DEFVAL   { down }
    ::= { wfNatIfEntry 6 } wfNatIfTxCount OBJECT-TYPE
    SYNTAX   Counter
    ACCESS   read-only
    STATUS   mandatory
    DESCRIPTION
        "Number of packets mapped over this interface from
        the local to the global network."
    ::= { wfNatIfEntry 7 }
```

FIG. 12C-2 wfNatIfRxCount OBJECT-TYPE
   SYNTAX   Counter
   ACCESS   read-only
   STATUS   mandatory
   DESCRIPTION
       "Number of packets mapped over this interface from
       the global to the local network.'"
   ::= { wfNatIfEntry 8 } wfNatIfPktDropCount OBJECT-TYPE
   SYNTAX   Counter
   ACCESS   read-only
   STATUS   mandatory
   DESCRIPTION
       "Number of packets dropped on this interface"
   ::= { wfNatIfEntry 9 } wfNatIfDomain OBJECT-TYPE
   SYNTAX   DisplayString
   ACCESS   read-write
   STATUS   mandatory
   DESCRIPTION
       "When wfNatIfType is set to biDirectional, specifies
       the Address Domain Name that this interface is
       connected to, otherwise set to null."
   ::= { wfNatIfEntry 10 }

FIG. 12D

```
wfNatAddressRangeTable OBJECT-TYPE
    SYNTAX  SEQUENCE OF WfNatAddressRangeEntry
    ACCESS  not-accessible
    STATUS  mandatory
    DESCRIPTION
        "Table of address ranges."
    ::= { wfNatGroup 8 } wfNatAddressRangeEntry OBJECT-TYPE
    SYNTAX  WfNatAddressRangeEntry
    ACCESS  not-accessible
    STATUS  mandatory
    DESCRIPTION
        "Information describing each of the available address ranges."
    INDEX  { wfNatAddressRangeAddress,
            wfNatAddressRangePrefixLen,
            wfNatAddressRangeIndex}
    ::= { wfNatAddressRangeTable 1 }

WfNatAddressRangeEntry ::= SEQUENCE {
    wfNatAddressRangeDelete
        INTEGER,
    wfNatAddressRangeDisable
        INTEGER,
    wfNatAddressRangeAddress
        IpAddress,
    wfNatAddressRangePrefixLen
        INTEGER,
    wfNatAddressRangeIndex
        INTEGER,
    wfNatAddressRangeNto1Addr
        IpAddress,
    wfNatAddressRangeType
        INTEGER,
    wfNatAddressRangeDomain
        DisplayString,
    wfNatAddressRangeTransPool
        INTEGER,
    wfNatAddressRangeStaticNextHop
        IpAddress,
    wfNatAddressRangeUnnumCct
        INTEGER
}
```

FIG. 12E

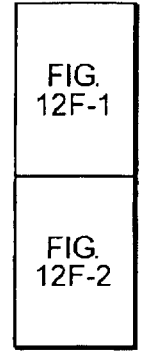

FIG. 12F

```
wfNatAddressRangeDelete OBJECT-TYPE
    SYNTAX  INTEGER {
        created(1),
        deleted(2)
    }
    ACCESS  read-write
    STATUS  mandatory
    DESCRIPTION
        "Create/Delete parameter. Default is created. Users perform
            a set operation on this object in order to create/delete
            an address range entry."
    DEFVAL { created }
    ::= { wfNatAddressRangeEntry 1 } wfNatAddressRangeDisable OBJECT-TYPE
    SYNTAX  INTEGER {
        enabled(1),
        disabled(2)
    }
    ACCESS  read-write
    STATUS  mandatory
    DESCRIPTION
        "Enable/Disable parameter. Default is enabled. Users perform
            a set operation on this object in order to enable/disable
            an address range entry."
    DEFVAL { enabled }
    ::= { wfNatAddressRangeEntry 2 }
```

FIG. 12F-1

```
wfNatAddressRangeAddress OBJECT-TYPE
    SYNTAX  IpAddress
    ACCESS  read-only
    STATUS  mandatory
    DESCRIPTION
        "The IP beginning address of this range entry."
    ::= { wfNatAddressRangeEntry 3 } wfNatAddressRangePrefixLen OBJECT-TYPE
    SYNTAX  INTEGER (1 .. 32)
    ACCESS  read-only
    STATUS  mandatory
    DESCRIPTION
        "The number of contiguous bits set in the IP address mask
            which are used to define the address range of the entry."
    ::= { wfNatAddressRangeEntry 4 } wfNatAddressRangeIndex OBJECT-TYPE
    SYNTAX  INTEGER
    ACCESS  read-only
    STATUS  mandatory
    DESCRIPTION
        "A unique value for this entry in wfNatAddressRangeTable."
    ::= { wfNatAddressRangeEntry 5 }
```

FIG. 12F-2

```
wfNatAddressRangeNto1Addr OBJECT-TYPE
    SYNTAX  IpAddress
    ACCESS  read-write
    STATUS  mandatory
    DESCRIPTION
        "When wfNatAddressRangeType is set to srcAddrFilter,
            specifies the N-to-1 translation address used for
        this range, otherwise set to zero."
    DEFVAL { 0 }
    ::= { wfNatAddressRangeEntry 6 } wfNatAddressRangeType OBJECT-TYPE
    SYNTAX  INTEGER {
            sourceAddrFilter(1),
            translationPool(2),
            domainSrcAddrFilter(3),
            domainTransPool(4)
        }
    ACCESS  read-write
    STATUS  mandatory
    DESCRIPTION
        "Denotes the type of address range being defined.
        sourceAddrFilter:    a range of IP addresses used to detect packets
            which need traditional NAT forwarding.
        translationPool:     for traditional NAT forwarding, a range of
            IP addresses from which translation addresses are picked.
        domainSrcAddrFilter: a range of IP addresses used to detect domain
            specific packets which need domain specific NAT forwarding.
        domainTransPool:     for domain specific NAT forwarding, a range of
            IP addresses from which domain specific translation addresses
            are picked."
    DEFVAL{ sourceAddrFilter }
    ::= { wfNatAddressRangeEntry 7 } wfNatAddressRangeDomain OBJECT-TYPE
    SYNTAX  DisplayString
    ACCESS  read-write
    STATUS  mandatory
    DESCRIPTION
        "When wfNatAddressRangeType is set to  domainSrcAddrFilter or
            domainTransPool, specifies the Address Domain Name that this
            address range is valid for, otherwise set to null."
    ::= { wfNatAddressRangeEntry 8 }
```

FIG. 12G

```
wfNatAddressRangeTransPool OBJECT-TYPE
    SYNTAX  INTEGER {
        inbound(1),
        outbound(2)
    }
    ACCESS  read-write
    STATUS  mandatory
    DESCRIPTION
        "This attribute is only valid for the wfNatAddressRangeType as
            domainSrcAddrFilter(3). The value of this attribute decides
            where to get the translation address for this range from.
            This could be either the translation Pool defined for the
            inbound domain or the outbound domain for the packet in
            question."
    DEFVAL{ outbound }
    ::= { wfNatAddressRangeEntry 9 } wfNatAddressRangeStaticNextHop OBJECT-TYPE
    SYNTAX  IpAddress
    ACCESS  read-write
    STATUS  mandatory
    DESCRIPTION
        "The IP address of the next hop of this range entry."
    DEFVAL{ 0 }
    ::= { wfNatAddressRangeEntry 10 } wfNatAddressRangeUnnumCct OBJECT-TYPE
    SYNTAX  INTEGER
    ACCESS  read-write
    STATUS  mandatory
    DESCRIPTION
        "This Nat Address range over the unnumbered interface."
    DEFVAL{ 0 }
    ::= { wfNatAddressRangeEntry 11 }
```

FIG. 12H

```
wfNatStaticMappingTable OBJECT-TYPE
    SYNTAX  SEQUENCE OF WfNatStaticMappingEntry
    ACCESS  not-accessible
    STATUS  mandatory
    DESCRIPTION
        "'This table creates instances of pre-defined NAT translations.'"
    ::= { wfNatGroup 9 } wfNatStaticMappingEntry OBJECT-TYPE
    SYNTAX  WfNatStaticMappingEntry
    ACCESS  not-accessible
    STATUS  mandatory
    DESCRIPTION
        "A single original source address to translated address
            translation."
    INDEX  { wfNatStaticMappingTransAddress,
        wfNatStaticMappingProtocol,
        wfNatStaticMappingTransPort }
    ::= { wfNatStaticMappingTable 1 }

WfNatStaticMappingEntry ::= SEQUENCE {
    wfNatStaticMappingDelete
        INTEGER,
    wfNatStaticMappingDisable
        INTEGER,
    wfNatStaticMappingOrigAddress
        IpAddress,
    wfNatStaticMappingTransAddress
        IpAddress,
    wfNatStaticMappingProtocol
        INTEGER,
    wfNatStaticMappingOrigPort
        INTEGER,
    wfNatStaticMappingTransPort
        INTEGER,
    wfNatStaticMappingInDomain
        DisplayString,
    wfNatStaticMappingOutDomain
        DisplayString,
    wfNatStaticMappingStaticNextHop
        IpAddress,
    wfNatStaticMappingUnnumCct
        INTEGER
}
```

FIG. 12I

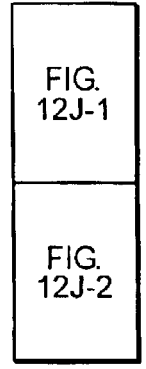

FIG. 12J

```
wfNatStaticMappingDelete OBJECT-TYPE
    SYNTAX INTEGER {
        created(1),
        deleted(2)
    }
    ACCESS read-write
    STATUS mandatory
    DESCRIPTION
        "Create/Delete parameter. Default is created. Users perform a set
            operation on this object in order to create/delete a static
            address translation entry."
    DEFVAL { created }
    ::= { wfNatStaticMappingEntry 1 } wfNatStaticMappingDisable OBJECT-TYPE
    SYNTAX INTEGER {
        enabled(1),
        disabled(2)
    }
    ACCESS read-write
    STATUS mandatory
    DESCRIPTION
        "Enable/Disable parameter. Default is enabled. Users perform a
            set operation on this object in order to enable/disable a static
            address translation entry."
    DEFVAL { enabled }
    ::= { wfNatStaticMappingEntry 2 }
```

FIG. 12J-1

```
wfNatStaticMappingOrigAddress OBJECT-TYPE
    SYNTAX  IpAddress
    ACCESS  read-write
    STATUS  mandatory
    DESCRIPTION
        "The original (un-translated) address of the translation."
    ::= { wfNatStaticMappingEntry 3 } wfNatStaticMappingTransAddress OBJECT-TYPE
    SYNTAX  IpAddress
    ACCESS  read-only
    STATUS  mandatory
    DESCRIPTION
        "The translated address of the translation."
    ::= { wfNatStaticMappingEntry 4 } wfNatStaticMappingProtocol OBJECT-TYPE
    SYNTAX  INTEGER
    ACCESS  read-only
    STATUS  mandatory
    DESCRIPTION
        "The IP protocol of the translation. Example values are
            6 for TCP, and 17 for UDP."
    ::= { wfNatStaticMappingEntry 5 }
```

FIG. 12J-2

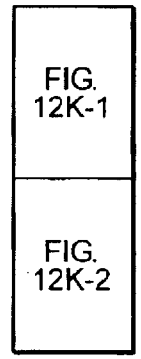

FIG. 12K

```
wfNatStaticMappingOrigPort OBJECT-TYPE
    SYNTAX  INTEGER
    ACCESS  read-write
    STATUS  mandatory
    DESCRIPTION
            "The original (domain specific) UDP or TCP port of the
                translation. This will only be relevent if the protocol
        is either UDP or TCP."
    ::= { wfNatStaticMappingEntry 6 } wfNatStaticMappingTransPort OBJECT-TYPE
    SYNTAX  INTEGER
    ACCESS  read-only
    STATUS  mandatory
    DESCRIPTION
            "The translated UDP or TCP port of the translation. This will
                only be relevent if the protocol is either UDP or TCP."
    ::= { wfNatStaticMappingEntry 7 } wfNatStaticMappingInDomain OBJECT-TYPE
    SYNTAX  DisplayString
    ACCESS  read-write
    STATUS  mandatory
    DESCRIPTION
            "This attribute specifies the name of the address domain that this
            source translation shall be valid for. In other words, this
            translation shall only be valid for source addresses coming
            inbound from this domain."
        DEFVAL { "private" }
    ::= { wfNatStaticMappingEntry 8 }
```

FIG. 12K-1

```
wfNatStaticMappingOutDomain OBJECT-TYPE
    SYNTAX  DisplayString
    ACCESS  read-write
    STATUS  mandatory
    DESCRIPTION
            "This attribute specifies the name of the outbound address
            domain that this translation will be valid for. In other words,
            this translation only applies to translations that will be
            forwarded out into this address domain."
    DEFVAL { "public" }
    ::= { wfNatStaticMappingEntry 9} wfNatStaticMappingStaticNextHop OBJECT-TYPE
    SYNTAX  IpAddress
    ACCESS  read-write
    STATUS  mandatory
    DESCRIPTION
        "The IP address of the next hop of this static entry."
    DEFVAL{ 0 }
    ::= { wfNatStaticMappingEntry 10 }
```

FIG. 12K-2

```
wfNatStaticMappingUnnumCct OBJECT-TYPE
    SYNTAX  INTEGER
    ACCESS  read-write
    STATUS  mandatory
    DESCRIPTION
        "This Nat static translation over the unnumbered interface."
    DEFVAL{ 0 }
    ::= { wfNatStaticMappingEntry 11 }
```

FIG. 12L

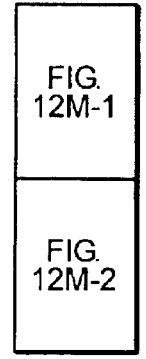

FIG. 12M

```
wfNatMappingTable OBJECT-TYPE
    SYNTAX  SEQUENCE OF WfNatMappingEntry
    ACCESS  not-accessible
    STATUS  mandatory
    DESCRIPTION
        "This table defines the current set of address translations
            that are in effect."
    ::= { wfNatGroup 10 } wfNatMappingEntry OBJECT-TYPE
    SYNTAX  WfNatMappingEntry
    ACCESS  not-accessible
    STATUS  mandatory
    DESCRIPTION
        "A single original source address to translated address
            translation."
    INDEX   { wfNatMappingTransAddress,
            wfNatMappingProtocol,
            wfNatMappingTransPort }
    ::= { wfNatMappingTable 1 }
```

FIG. 12M-1

```
WfNatMappingEntry ::= SEQUENCE {
    wfNatMappingOrigAddress
        IpAddress,
    wfNatMappingTransAddress
        IpAddress,
    wfNatMappingProtocol
        INTEGER,
    wfNatMappingOrigPort
        INTEGER,
    wfNatMappingTransPort
        INTEGER,
    wfNatMappingTxCount
        Counter,
    wfNatMappingRxCount
        Counter,
    wfNatMappingTimeout
        Counter,
    wfNatMappingMode
        INTEGER,
    wfNatMappingInDomain
        DisplayString,
    wfNatMappingOutDomain
        DisplayString
} wfNatMappingOrigAddress OBJECT-TYPE
    SYNTAX  IpAddress
    ACCESS  read-only
    STATUS  mandatory
    DESCRIPTION
        "The original (un-translated) address of the translation."
    ::= { wfNatMappingEntry 1 }
```

FIG. 12M-2

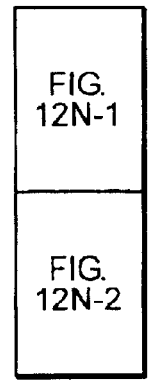

FIG. 12N

```
wfNatMappingTransAddress OBJECT-TYPE
    SYNTAX  IpAddress
    ACCESS  read-only
    STATUS  mandatory
    DESCRIPTION
        "The translated address of the translation."
    ::= { wfNatMappingEntry 2 } wfNatMappingProtocol OBJECT-TYPE
    SYNTAX  INTEGER
    ACCESS  read-only
    STATUS  mandatory
    DESCRIPTION
        "'The IP protocol of the translation.'"
    ::= { wfNatMappingEntry 3 } wfNatMappingOrigPort OBJECT-TYPE
    SYNTAX  INTEGER
    ACCESS  read-only
    STATUS  mandatory
    DESCRIPTION
        "When the translation is for a TCP connection, this denotes
            the original TCP port number."
    ::= { wfNatMappingEntry 4 }
```

FIG. 12N-1

```
wfNatMappingTransPort OBJECT-TYPE
    SYNTAX  INTEGER
    ACCESS  read-only
    STATUS  mandatory
    DESCRIPTION
        "When the translation is for a TCP connection, this denotes
            the translated TCP port number."
    ::= { wfNatMappingEntry 5 } wfNatMappingTxCount OBJECT-TYPE
    SYNTAX  Counter
    ACCESS  read-only
    STATUS  mandatory
    DESCRIPTION
        "Number of packets forwarded by NAT using this translation."
    ::= { wfNatMappingEntry 6 } wfNatMappingRxCount OBJECT-TYPE
    SYNTAX  Counter
    ACCESS  read-only
    STATUS  mandatory
    DESCRIPTION
        "Number of packets received by NAT using this translation."
    ::= { wfNatMappingEntry 7 }
```

FIG. 12N-2

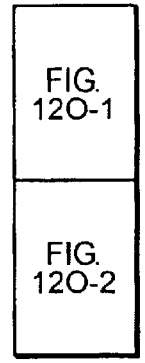

FIG. 120

```
wfNatMappingTimeout OBJECT-TYPE
    SYNTAX  Counter
    ACCESS  read-only
    STATUS  mandatory
    DESCRIPTION
        "The time in seconds since this translation entry was last used.
         This is used to age out translation entries."
    ::= { wfNatMappingEntry 8 } wfNatMappingMode OBJECT-TYPE
    SYNTAX  INTEGER
    ACCESS  read-only
    STATUS  mandatory
    DESCRIPTION
        "This is the bit mask representing the type of this translation.
         Each bit specifies the type as follows:

The translation could be only ONE of the following three...

0x01000000 - This translation is origianted on this router,
                         i.e. this NAT router performed the translation.
         0x02000000 - This translation is learned from the peer,
                         i.e. this translation was learned from the
                 peer using NAT Synchronization feature.
         0x04000000 - This translation is owned,
                         i.e. it was originally learned from peer, but
                         this router received traffic which used this
                         translation.

...and only ONE of the following three.

0x00000010 - This translation is the STATIC translation.
         0x00000020 - This translation is Dynamic(1 to 1) translation.
         0x00000040 - This translation is N to 1 translation."
    DEFVAL { 0 }
    ::= { wfNatMappingEntry 9 }
```

FIG. 120-1 wfNatMappingInDomain OBJECT-TYPE
  SYNTAX DisplayString
  ACCESS read-only
  STATUS mandatory
  DESCRIPTION
        "This attribute specifies the name of the address domain that this
        source translation shall be valid for. In ther words, this
        translation shall only be valid for source addresses coming
        inbound from this domain."
  ::= { wfNatMappingEntry 10 }

FIG. 120-2

```
wfNatMappingOutDomain OBJECT-TYPE
    SYNTAX DisplayString
    ACCESS read-only
    STATUS mandatory
    DESCRIPTION
        "This attribute specifies the name of the outbound address domain
        that this translation will be valid for. In other words, this
        translation only applies to translations that will be forwarded
        out into this address domain."
    ::= { wfNatMappingEntry 11 }

END -- Wellfleet-NPT-MIB
```

MANAGEMENT INFORMATION BASE FOR A MULTI-DOMAIN NETWORK ADDRESS TRANSLATOR

CROSS-REFERENCE TO RELATED APPLICATIONS

This patent application may be related to the following commonly owned U.S. patent application, which is hereby incorporated by reference in its entirety:

Application Ser. No. 09/274,940 entitled NETWORK ADDRESS TRANSLATION IN A NETWORK HAVING MULTIPLE OVERLAPPING ADDRESS DOMAINS, filed on Mar. 23, 1999 in the names of Timothy Cunningham, Thomas Meehan, and Manish Patel

FIELD OF THE INVENTION

The present invention relates generally to communication networks, and, more particularly, to managing a multi-domain network address translator for translating network addresses in a network having multiple overlapping address domains.

BACKGROUND OF THE INVENTION

In today's information age, communication networks are increasingly used for transferring information among a multitude of communication devices. As demand for communication services continues to grow, the demand on these communication networks for carrying increasing amounts of information at increasing speeds continues to grow. Therefore, communication networks are evolving to more efficiently handle these increased demands.

In a common networking model, a large communication network is typically constructed by segregating the multitude of communication devices into a number of subnetworks, and internetworking the subnetworks over a high-speed backbone network. In such a communication network, each communication device is typically assigned a network address that is used for routing packets between a source communication device and a destination communication device within the communication network. In order to permit efficient use of these network addresses, the communication network may be logically divided into multiple address domains. Network addresses are required to be unique within a particular address domain, but are not required to be unique across multiple address domains.

Unfortunately, when the communication network is logically divided into multiple address domains having overlapping network addresses, a particular network address may map to multiple communication devices, in which case the network address does not uniquely identify one communication device within the communication network. Such an overlapping network address cannot be used as the destination address of a packet because it is ambiguous as to the destination communication device for the packet. Likewise, such an overlapping network address, when used as the source address of a packet, is ambiguous as to the source communication device for the packet.

Thus, a need has remained for a network address translation technique for resolving ambiguous network addresses across multiple overlapping address domains.

SUMMARY OF THE INVENTION

In accordance with one aspect of the invention, a management information base (MIB) for a multi-domain network address translator provides management objects for configuring and controlling the multi-domain network address translator. The MIB includes management objects for defining a domain-specific source address filter range, which is a range of addresses used to detect domain-specific packets that require domain-specific network address translation forwarding. The domain-specific source address filter management objects include a beginning address, a prefix length, a domain indicator, and a domain-specific translation pool indicator. The MIB also includes management objects for defining a domain-specific translation pool, which is a range of addresses from which domain-specific translation addresses are selected for domain-specific network address translation forwarding. The domain-specific translation pool management objects include a beginning address, a prefix length, and a domain indicator.

BRIEF DESCRIPTION OF THE DRAWINGS

The foregoing and other objects and advantages of the invention will be appreciated more fully from the following further description thereof with reference to the accompanying drawings wherein:

FIG. 2A is a diagram showing an exemplary source address translation table for a first source (inbound) address domain in the communication network in accordance with an embodiment of the present invention;

FIG. 2B is a diagram showing an exemplary source address translation table for a second source (inbound) address domain in the communication network in accordance with an embodiment of the present invention;

FIG. 2C is a diagram showing an exemplary source address translation table for a third source (inbound) address domain in the communication network in accordance with an embodiment of the present invention;

FIG. 2D is a diagram showing an exemplary destination address translation table in accordance with an embodiment of the present invention;

FIG. 11B is a block diagram showing the relevant logic blocks of an exemplary packet processor in accordance with an embodiment of the present invention; and FIGS. 12A–12P show an exemplary management information base for managing a multi-domain network address translator in accordance with an embodiment of the present invention.

DETAILED DESCRIPTION OF A PREFERRED EMBODIMENT

Figure 1:
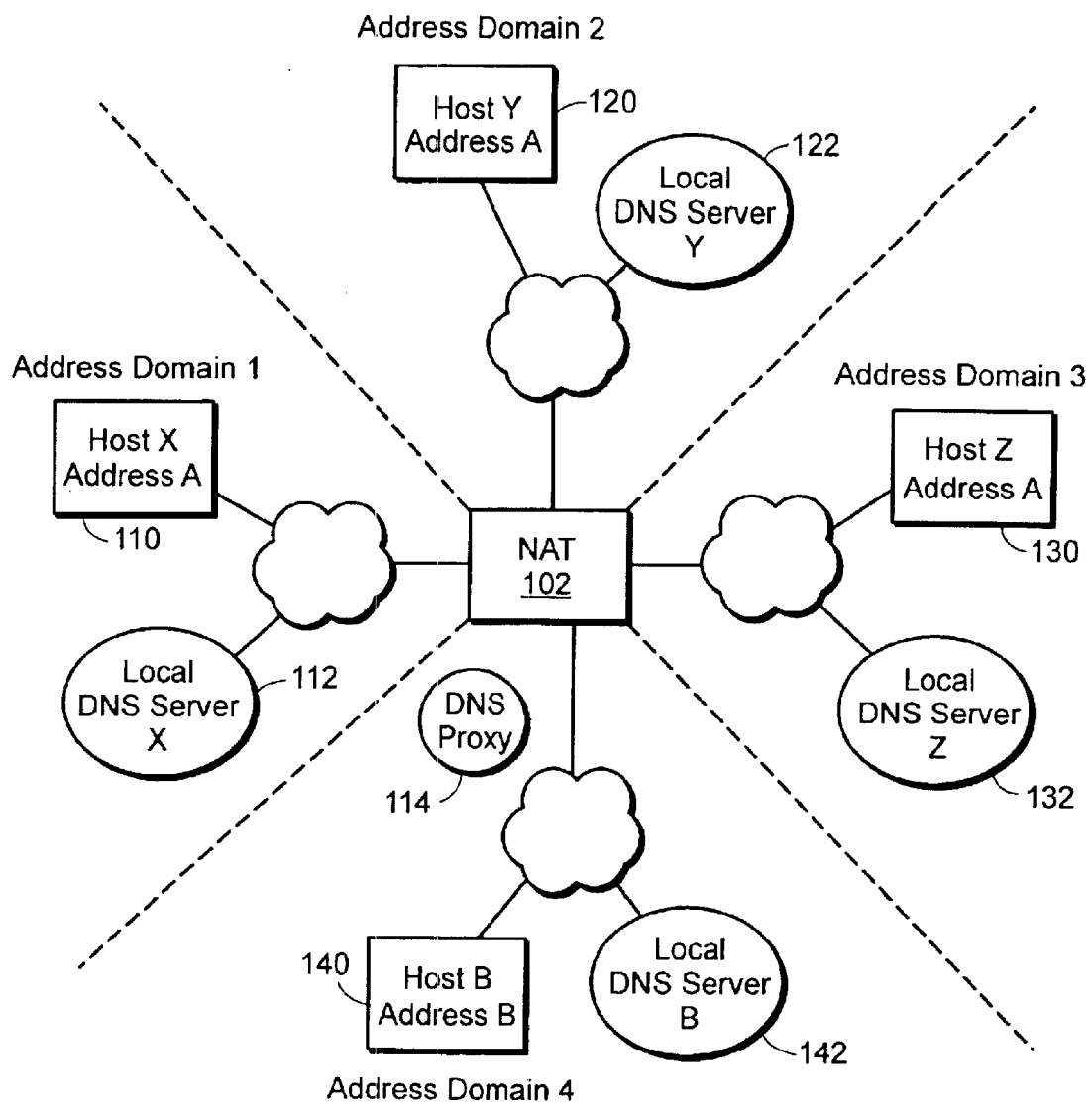
FIG. 1 is a block diagram showing an exemplary communication network having multiple overlapping address domains in accordance with an embodiment of the present invention.

As discussed above, a need has remained for a network address translation technique for resolving ambiguous network addresses across multiple overlapping address domains. In accordance with the present invention, a network address translator (NAT) maps an overlapping domain-specific network address in a first address domain (referred to hereinafter as a "local address") to a unique global address that is specific to a second address domain. Thus, the overlapping network address in the first address domain may map to multiple global addresses, where each global address is unique to one of the other address domains. The NAT uses the network address mappings to translate the source address and/or the destination address of a packet before the packet is routed from the source communication device (referred to hereinafter as the "source host") to its intended destination communication device (referred to hereinafter as the "destination host"). Specifically, the NAT translates the destination address from a destination host global address (which uniquely identifies both the source address domain and the destination address domain) to its corresponding destination host local address, upon determining that the destination address requires an address translation. Likewise, the NAT translates the source address from an overlapping source host local address to a unique source host global address based upon the source address domain and the destination address domain, upon determining that the source address requires an address translation. By translating the source address and/or the destination address, the resulting packet is able to be routed to the destination host in the destination address domain using the destination host local address, and the destination host is able to uniquely identify the source host for the packet using the unique source host global address.

Network address translation has been used in the past to allow local addresses to be reused within a communication network. One prior art network address translation technique is described in an Internet Engineering Task Force (IETF) document entitled *The IP Network Address Translator (NAT)*, by K. Egevang and P. Francis (May 1994). In a typical prior art embodiment, the NAT maps a local address to a single global address irrespective of the destination address domain. Thus, when the local address is included as the source address in a packet, the NAT translates the local address into the global address without regard for the destination address domain before forwarding the packet to the destination host. Likewise, when the global address is included as the destination address in a packet, the NAT translates the global address into the local address before routing the packet to the destination host.

In certain networking models, it is desirable for the local address to map to a different global address for each destination address domain. The present invention provides a network address translation technique that allows the local address to be mapped to a different global address for each destination address domain. Specifically, a preferred NAT maps the local address to a different global address for each destination address domain, where each global address is unique within the communication network and maps uniquely to the local address. When the local address is included as the source address in a packet transmitted to a particular destination address domain, the preferred NAT translates the local address into the specific global address for the destination address domain. Likewise, when a global address is included as the destination address of a packet, the preferred NAT translates the global address into the local address.

In a preferred embodiment of the present invention, the NAT performs address translations for routing packets in a communication network having multiple overlapping address domains, such as the exemplary communication network 100 as shown in FIG. 1. In the exemplary communication network 100, there are three (3) hosts that share a common network address A across three (3) overlapping address domains, namely host X 110 in address domain 1, host Y 120 in address domain 2, and host Z 130 in address domain 3. There is also one (1) host with a non-overlapping network address, namely host B 140 in address domain 4. Thus, the address A represents the local address for each host that uniquely identifies a particular host within its own address domain. Unfortunately, the address A is ambiguous within the entire communication network 100, since it does not uniquely identify a specific host within the entire communication network 100. Therefore, the communication network 100 includes a NAT 102 to perform, among other things, the network address translations needed to resolve the ambiguity of the address A within the communication network 100.

In order for a host in an address domain q to reference a host in an address domain p having the overlapping address A, the NAT 102 maps the overlapping address A from the address domain p to a global address that is unique to the address domain q and is also unique within the communication network 100. For convenience, the global address for a host having the local address A in the address domain p when referenced from a host in the address domain q is represented by the symbol $A_{pq}$. Thus, $A_{pq}$ is the global address for the address A in address domain p when referenced from address domain q.

Thus, with reference to the example shown in FIG. 1, the NAT 102 typically maintains at least the following global address mappings:

$A_{12}$ is the host X global address when referenced from address domain 2;

$A_{13}$ is the host X global address when referenced from address domain 3;

A14 is the host X global address when referenced from address domain 4;

A21 is the host Y global address when referenced from address domain 1;

A23 is the host Y global address when referenced from address domain 3;

A24 is the host Y global address when referenced from address domain 4;

A31 is the host Z global address when referenced from address domain 1;

A32 is the host Z global address when referenced from address domain 2; and

A34 is the host Z global address when referenced from address domain 4.

In a preferred embodiment of the present invention, the NAT 102 maintains a separate source address translation table for each overlapping address domain, and maintains a single destination address translation table. Each source address translation table maps the overlapping network addresses in the source address domain to the corresponding global addresses for each of the potential destination address domains. The destination address translation table maps the global addresses to their corresponding local addresses.

Thus, in the example shown in FIG. 1, the preferred NAT 102 maintains three (3) source address translation tables and one (1) destination address translation table. An exemplary source address translation table for address domain 1, shown in FIG. 2A, maps the host X local address (i.e., A) to the respective host X global addresses for domains 2, 3, and 4 (i.e., A12, A13, and A14, respectively). An exemplary source address translation table for address domain 2, shown in FIG. 2B, maps the host Y local address (i.e., A) to the respective host Y global addresses for domains 1, 3, and 4 (i.e., A21, A23, and A24, respectively). An exemplary source address translation table for address domain 3, shown in FIG. 2C, maps the host Z local address (i.e., A) to the respective host Z global addresses for domains 1, 2, and 4 (i.e., A31, A32, and A34, respectively). No source address translation table is maintained for address domain 4, since, in this example, address domain 4 has no overlapping network addresses. An exemplary destination address translation table, shown in FIG. 2D, maps the global addresses to their corresponding local addresses.

It should be noted that, by maintaining the source (inbound) domain and the destination (outbound) domain in the tables, it is possible to combine all source address translation tables into a single source address translation table. It should also be noted that, by maintaining the source (inbound) domain and the destination (outbound) domain in the tables, the source table(s) and the destination table provide redundant information, such that, for example, the source address translation table(s) can be searched in reverse to obtain a local address corresponding to a particular global address, or the destination address translation table can be searched in reverse to obtain a global address corresponding to a particular local address in the source address domain. These and other alternative embodiments will be apparent to a skilled artisan.

In order to transfer a packet from the source host in the source address domain to the destination host in the destination address domain using network address translation, the appropriate entries must be created in the source address table(s) and the destination address table. Specifically, for any network address that must be translated, there must be a source address translation table entry mapping the source host local address in the source address domain to a unique source host global address for the destination address domain, and there must be a destination address translation table entry mapping the source host global address for the destination address domain back to the source host local address in the source address domain.

Typically, the address translation table entries are created dynamically by the NAT 102, although the address translation table entries may alternatively be created manually. In order for the NAT 102 to create a source address translation table entry and its corresponding destination address translation table entry, the NAT 102 is provided with at least a source host local address, a source address domain identifier, and a destination address domain identifier. The NAT 102 selects a source host global address from a pool of global network addresses, and creates the address translation table entries. Specifically, the NAT 102 creates a source address translation table entry mapping the source host local address in the source address domain to the selected source host global address for the destination address domain, and creates a destination address translation entry mapping the selected source host global address for the destination address domain to the source host local address in the source address domain.

Figure 3:
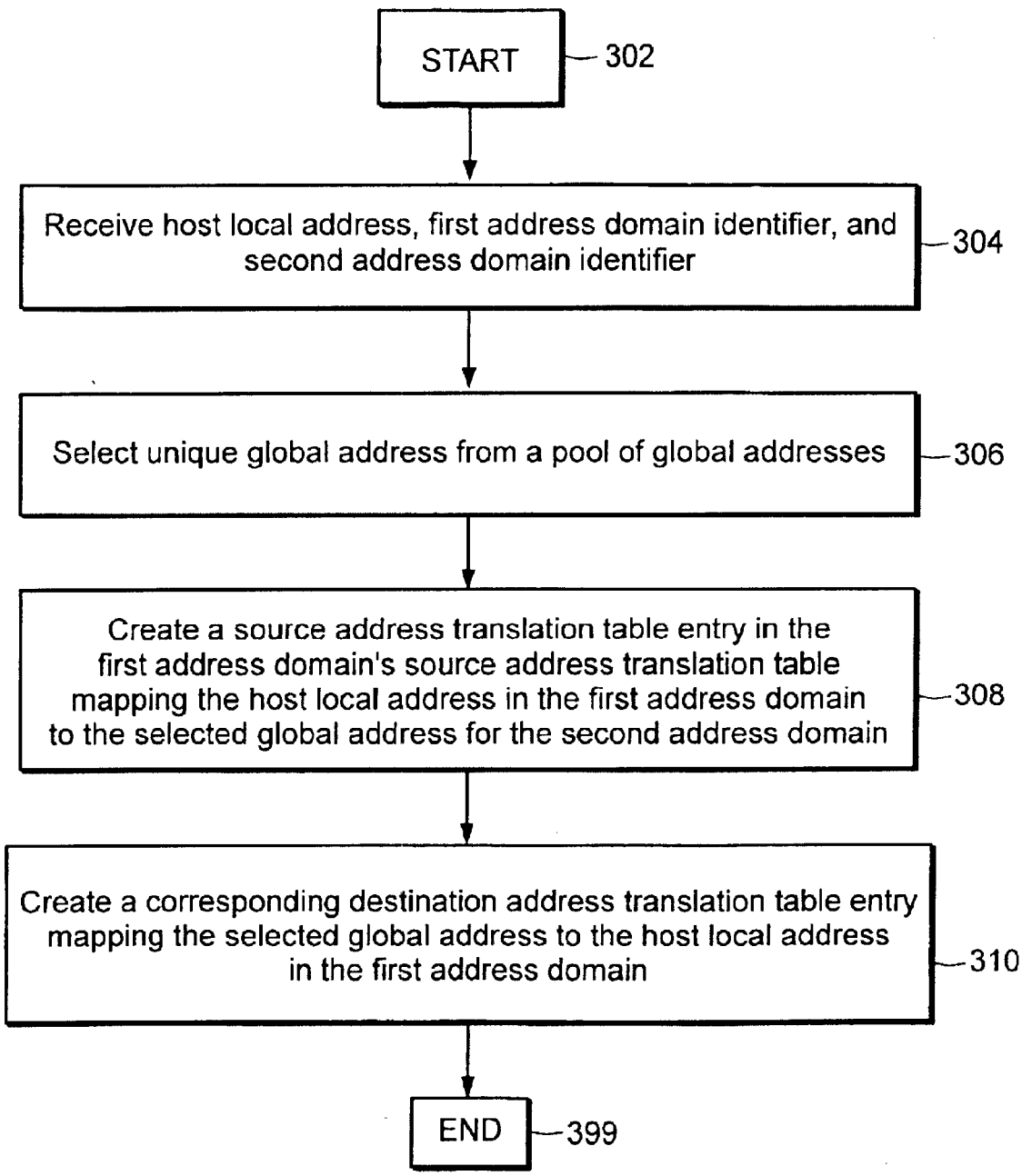
FIG. 3 is a logic flow diagram showing exemplary network address translator logic for creating a source address translation table entry and a corresponding destination address translation table entry in accordance with an embodiment of the present invention.

FIG. 3 is a logic flow diagram showing exemplary NAT 102 logic for creating a source address translation table entry and its corresponding destination address translation table entry. Beginning at step 302, the logic receives a host local address, a first address domain identifier identifying the host address domain, and a second address domain identifier identifying an address domain from which the host is referenced, in step 304. The logic proceeds to select a unique global address for the host, in step 306, preferably from a pool of global addresses maintained by the NAT 102. Upon selecting the unique global address in step 306, the logic creates a source address translation table entry in the first address domain's source address translation table, in step 308, and a corresponding destination address translation table entry, in step 310. The source address translation table entry maps the host local address in the first address domain to the selected global address for the second address domain. The destination address translation table entry maps the selected global address to the host local address in the first address domain. The logic terminates in step 399.

In a preferred embodiment of the present invention, the NAT 102 dynamically creates certain address translation table entries as part of a domain name resolution procedure, and dynamically creates other address translation entries as part of a packet processing procedure (described in more detail below). The domain name resolution procedure is described in the related U.S. patent application entitled DOMAIN NAME RESOLUTION IN A NETWORK HAVING MULTIPLE OVERLAPPING ADDRESS DOMAINS, which was incorporated by reference above. The domain name resolution procedure enables the source host to obtain a destination host global address for the destination host based upon a domain name of the destination host. More particularly, in order for the source host to transmit a packet to the destination host, the source host is provided with a domain name that is associated with the destination host. The domain name uniquely identifies the destination host, although the domain name is not a network address. The source host invokes the domain name resolution procedure in order to resolve the domain name into the destination host global address. Because the destination host local address may overlap with other addresses when the communication network includes multiple overlapping address domains, a preferred domain name resolution procedure utilizes network address translation to translate the overlapping destination host local address into a unique destination host global address.

Specifically, in order for the source host to resolve the destination host domain name into the destination host global address, the source host sends a domain name resolution request to a local DNS Server in the source address domain. The domain name resolution request includes, among other things, a source address equal to the source host local address and the domain name associated with the destination host. The local DNS Server in the source address domain maintains a cache of domain name/network address mappings for hosts within the source address domain. Upon receiving the domain name resolution request from the source host, the local DNS Server in the source address domain determines the destination host domain name corresponds to a host in a different address domain. The local DNS Server therefore sends a domain name resolution request to the DNS Proxy 104.

The DNS Proxy 104 performs domain name resolution across multiple address domains. Upon receiving the domain name resolution request from the local DNS Server in the source address domain, the DNS Proxy 104 determines the destination address domain for the destination host domain name, and sends a domain name resolution request to the local DNS Server in the destination address domain. The local DNS Server in the destination address domain maintains a cache of domain name/network address mappings for hosts within the destination address domain. Upon receiving the domain name resolution request from the DNS Proxy 104, the local DNS Server in the destination address domain resolves the domain name, and returns the destination host local address to the DNS Proxy 104.

Upon receiving the destination host local address from the local DNS Server in the destination address domain, the DNS Proxy 104 sends a translation request to the NAT 102 to translate the destination host local address into a unique destination host global address. The translation request includes, among other things, a source address domain identifier, the destination host local address, and a destination address domain identifier.

The NAT 102 maintains a pool of global network addresses, and also maintains a number of address translation entries, where each address translation entry maps a local host address from one address domain to a global address that is specific to another address domain. Upon receiving the translation request from the DNS Proxy 104, the NAT 102 first determines whether there is an existing address translation table entry mapping the destination host local address to a destination host global address that is specific to the source address domain. If there is not an existing address translation table entry mapping the destination host local address to a destination host global address that is specific to the source address domain, then the NAT 102 creates the appropriate address translation table entries. Specifically, the NAT 102 selects a destination host global address from the pool of global network addresses, and creates both a source address translation entry and a corresponding destination address translation entry mapping the destination host local address to the destination host global address specifically for the source address domain. The source address translation table entry includes a Source Local Address field equal to the destination host local address, a Source Address Domain field equal to the destination address domain, a Destination Address Domain field equal to the source address domain, and a Source Global Address field equal to the selected destination host global address. The corresponding destination address translation table entry includes a Destination Global Address field equal to the selected destination host global address, a Source Address Domain field equal to the source address domain, a Destination Address Domain field equal to the destination address domain, and a Destination Local Address field equal to the destination host local address. The NAT 102 sends a translation response to the DNS Proxy 104 including the destination host global address.

Upon receiving the translation response from the NAT 102, the DNS Proxy 104 sends a domain name resolution response to the local DNS Server in the source address domain including the destination host global address. The local DNS Server in the source address domain, in turn, sends a domain name resolution response to the source host including the destination host global address. Thus, the domain name associated with the destination host is resolved into a unique destination host global address that the source host can use to transmit a packet to the destination host.

Figure 4:
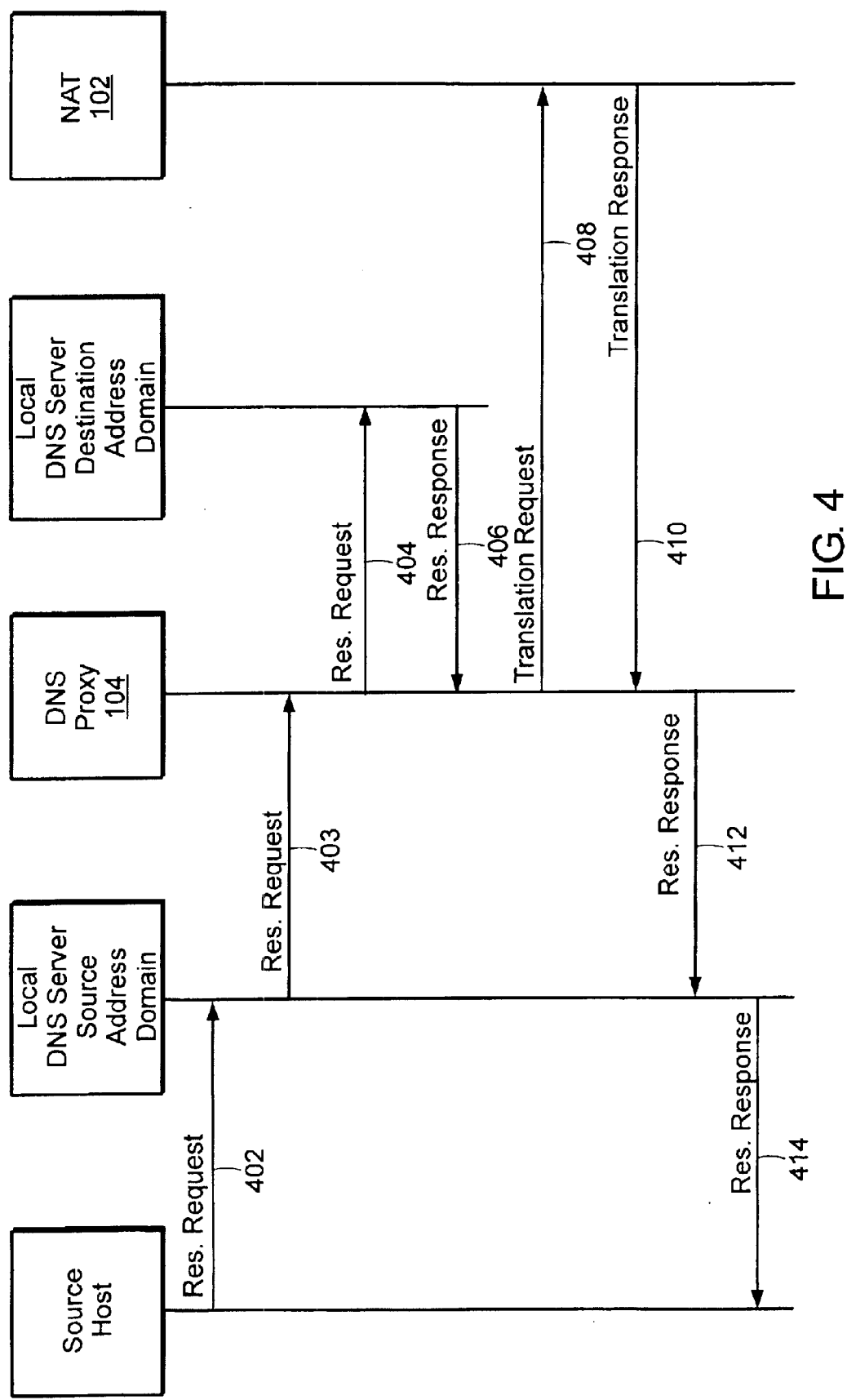
FIG. 4 is a message flow diagram showing an exemplary message flow for resolving a domain name into a destination host global address in accordance with an embodiment of the present invention.

FIG. 4 is a message flow diagram showing an exemplary message exchange among the source host in the source address domain, the local DNS Server in the source address domain, the DNS Proxy 104, the local DNS Server in the destination address domain, and the NAT 102 for resolving the destination host domain name into the unique destination host global address. Specifically, the source host sends a domain name resolution request message 402 to the local DNS Server in the source address domain including, among other things, a source address equal to the source host local address and the destination host domain name. Since the local DNS Server in the source address domain is unable to resolve the destination host domain name, the local DNS Server in the source address domain sends a domain name resolution request message 403 to the DNS Proxy 104. The DNS Proxy 104, in turn, sends a domain name resolution request message 404 to the local DNS Server in the destination address domain including, among other things, the destination host domain name. Upon receiving the domain name resolution request message 404, the local DNS Server in the destination address domain resolves the destination host domain name into its corresponding destination host local address, and sends a domain name resolution response message 406 to the DNS Proxy 104 including, among other things, the destination host local address. Upon receiving the domain name resolution response message 406 including the destination host local address, the DNS Proxy 104 sends a translation request message 408 to the NAT 102 including, among other things, the source address domain identifier, the destination host local address, and the destination address domain identifier. Upon receiving the translation request message 408, the NAT 102 creates the appropriate address translation entries, if necessary, and sends a translation response message 410 to the DNS Proxy 104 including, among other things, the destination host global address. The DNS Proxy 104 sends a domain name resolution response message 412 to the local DNS Server in the source address domain, which, in turn, sends a domain name resolution response message 414 to the source host including, among other things, the destination host global address.

Figure 5:
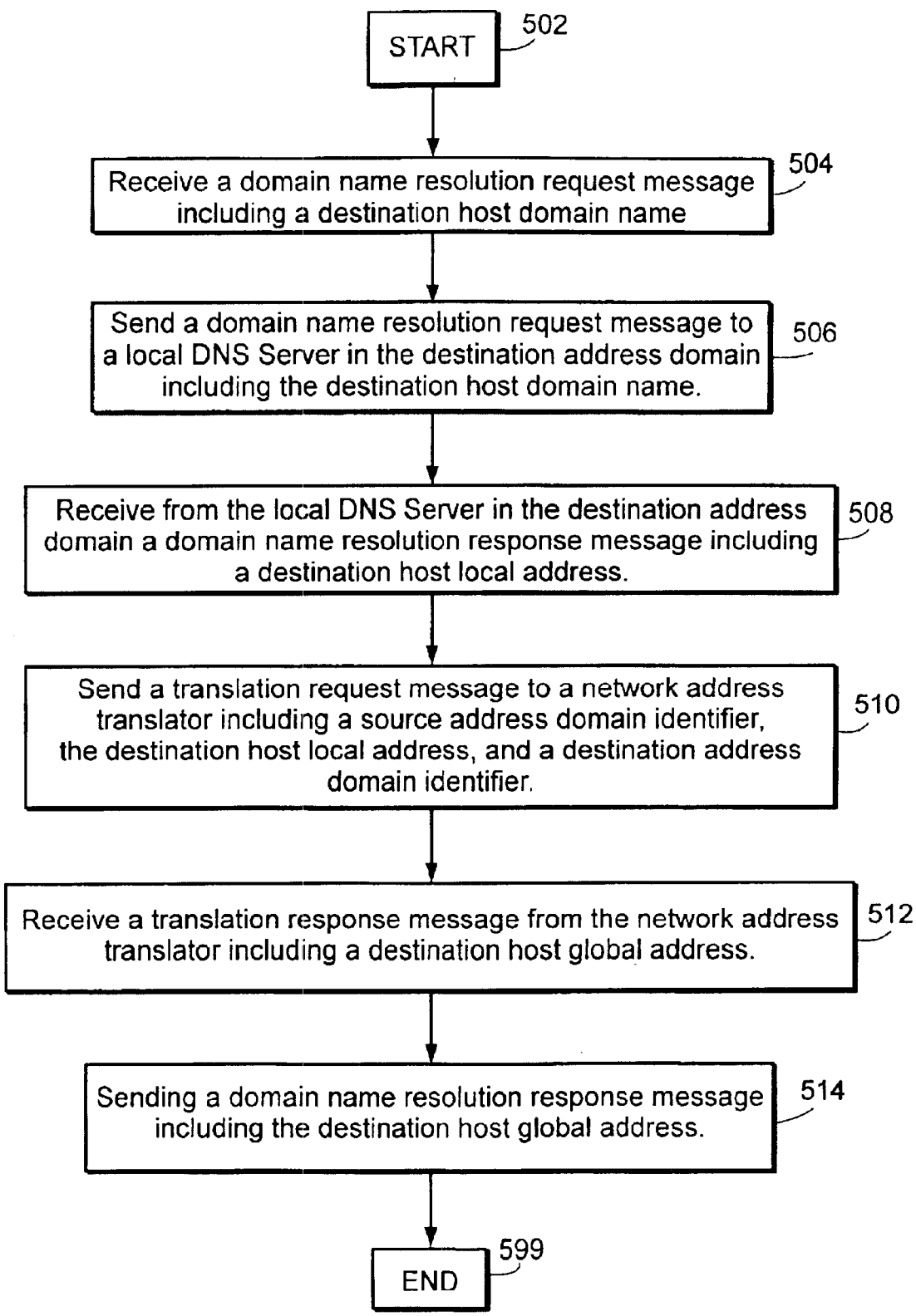
FIG. 5 is a logic flow diagram showing exemplary domain name system proxy logic for resolving a domain name into a destination host global address in accordance with an embodiment of the present invention.

FIG. 5 is a logic flow diagram showing exemplary DNS Proxy 104 logic for resolving a domain name in a network having multiple overlapping address domains. Beginning in step 502, the DNS Proxy 104 receives the domain name resolution request message 403, in step 504. The domain name resolution request message 403 includes, among other things, the destination host domain name associated with the destination host in the destination address domain.

The DNS Proxy 104 sends the domain name resolution request message 404 to the local DNS Server in the destination address domain, in step 506. The domain name resolution request message 404 includes, among other things, the destination host domain name. The DNS Proxy 104 then monitors for the domain name resolution response message 406 from the local DNS Server in the destination address domain including the destination host local address.

Upon receiving the domain name resolution response message 406 including the destination host local address, in step 508, the DNS Proxy 104 sends the translation request message 408 to the NAT 102, in step 510. The translation request message 408 includes, among other things, the source address domain identifier, the destination host local address, and the destination address domain identifier. The DNS Proxy 104 then monitors for the translation response message 410 from the NAT 102 including the destination host global address.

Upon receiving the translation response message 410 from the NAT 102, in step 512, the DNS Proxy 104 sends the domain name resolution response message 412, in step 514. The domain name resolution response message 412 includes, among other things, the destination host global address. The DNS Proxy 104 logic terminates in step 599.

Figure 6:
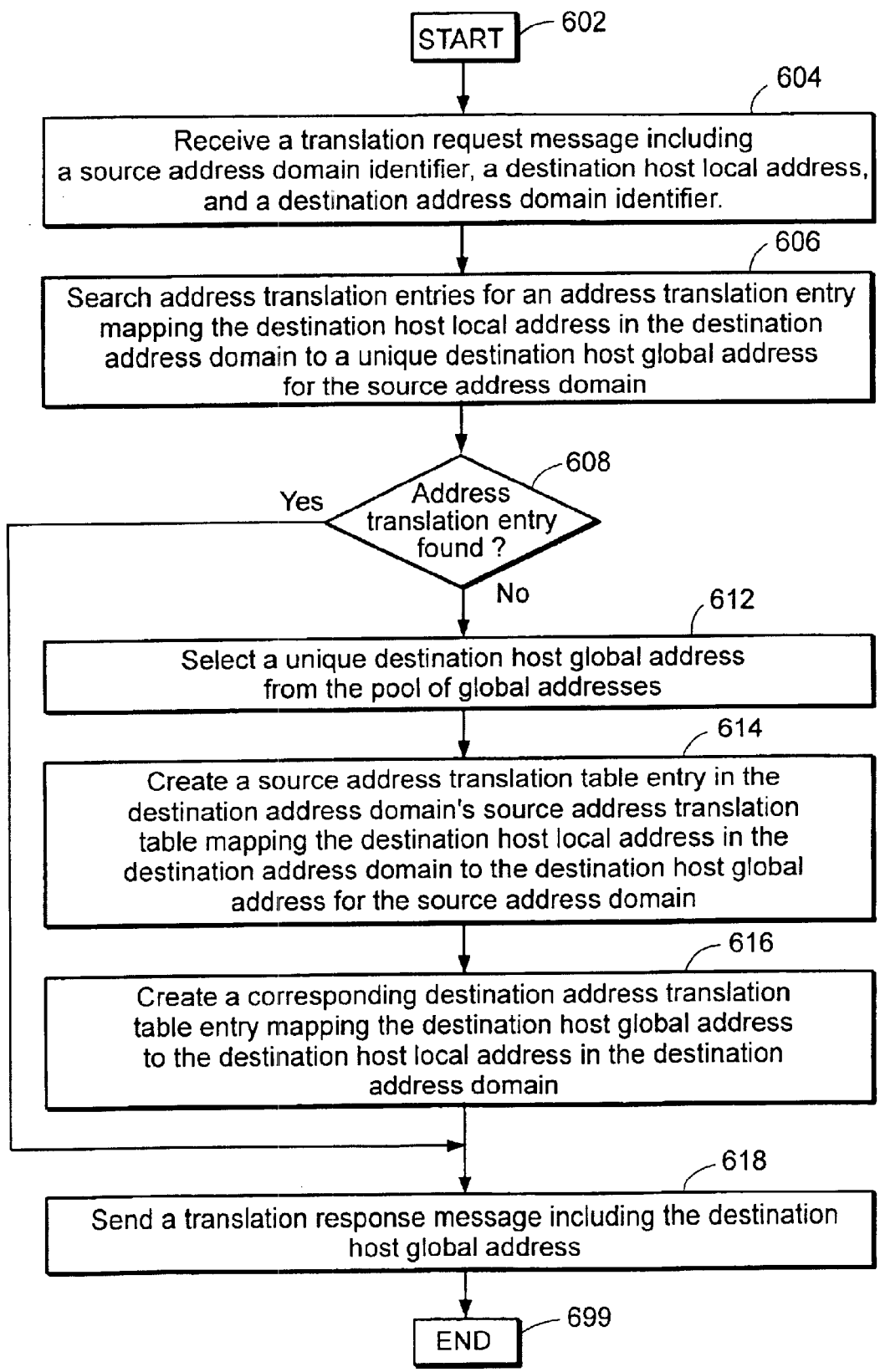
FIG. 6 is a logic flow diagram showing exemplary network address translator logic for translating a destination host local address into a destination host global address as part of a domain name resolution procedure in accordance with an embodiment of the present invention.

FIG. 6 is a logic flow diagram showing exemplary NAT 102 logic for translating the destination host local address into the unique destination host global address that is specific to the source address domain as part of the domain name resolution procedure. Beginning in step 602, the NAT 102 receives the translation request message 408 from the DNS Proxy 104, in step 604. The translation request message 408 includes, among other things, the source address domain identifier, the destination host local address, and the destination address domain identifier. The NAT 102 then searches the address translation entries for an address translation entry mapping the destination host local address in the destination address domain to a unique destination host global address for the source address domain, in step 606. If the NAT 102 finds such as address translation entry (YES in step 608), then the NAT 102 proceeds to step 618. Otherwise (NO in step 608), the NAT 102 creates the source address translation table entry and the corresponding destination address translation entry.

In order to create the address translation table entries, the NAT 102 first selects a unique destination host global address, in step 612, preferably from a pool of global network addresses maintained by the NAT 102. Upon selecting the destination host global address in step 612, the NAT 102 creates a source address translation table entry in the destination address domain's source address translation table, in step 614, and a corresponding destination address translation table entry, in step 616. The source address translation table entry maps the destination host local address in the destination address domain to the destination host global address for the source address domain. The destination address translation table entry maps the destination host global address to the destination host local address in the destination address domain.

In step 618, the NAT 102 sends the translation response message 412 including the destination host global address. The NAT 102 logic terminates in step 699.

Once the source host has obtained the destination host global address, either through domain name resolution or some other means, the source host transmits a packet including, as the destination address, the destination host global address for the source address domain, and, as the source address, the source host local address. The destination address uniquely identifies the destination host within the communication network 100. However, the source address is an ambiguous address within the communication network 100.

Upon receiving the packet, the NAT 102 uses the destination address to determine, among other things, the destination address domain for the packet. However, the NAT 102 cannot simply route the packet to the destination host over the destination address domain using traditional routing techniques. This is because the destination address in the packet is not equal to the destination host local address in the destination address domain, and, consequently, the packet would not be received by the destination host in the destination address domain.

Therefore, after determining that the packet requires address translation, the NAT 102 translates the destination address from the destination host global address into the destination host local address. In order to translate the destination address, the NAT 102 uses the destination address translation table to obtain the destination host local address, specifically by finding the destination address translation table entry corresponding to the destination host global address and obtaining therefrom the destination host local address.

In certain situations, the NAT 102 may also have to translate the source address in the packet from the source host local address in the source address domain into a unique source host global address for the destination address domain. Such an address translation is required when the source host local address is an overlapping address within the communication network. The source address translation is done so that the destination host receives a globally unique source address that uniquely identifies the source host within the communication network. The source address can therefore be used by the destination host, for example, to send a response packet to the source host.

In order to translate the source address, the NAT 102 first determines both the source domain (either implicitly based upon the interface over which the packet is received or explicitly from the destination address translation table entry) and the destination domain (from the destination address translation table entry) for the packet. The NAT 102 then searches the address translation entries to find an address translation entry mapping the source host local address in the source address domain to a source host global address for the destination address domain. If the NAT 102 finds such an address translation entry, then the NAT 102 translates the source address in the packet by extracting the source host global address from the address translation entry and replacing the source host local address in the packet with the source host global address. However, if there is no address translation entry mapping the source host local address in the source address domain to a source host global address for the destination address domain, then the NAT 102 dynamically allocates a source host global address for the destination address domain, creates the appropriate address translation entries, and translates the source address in the packet by replacing the source host local address in the packet with the dynamically allocated source host global address.

More specifically, the NAT 102 first selects the source host global address from a pool of network addresses. The NAT 102 then creates a source address translation table entry in the source address translation table for the source address domain and a corresponding destination address translation table entry in the destination address translation table. The source address translation table entry includes a Source Local Address field equal to the source host local address, a Source Address Domain field equal to the source address domain, a Destination Address Domain field equal to the destination address domain, and a Source Global Address field equal to the selected source host global address. The corresponding destination address translation table entry includes a Destination Global Address field equal to the selected source host global address, a Source Address Domain field equal to the destination address domain, a Destination Address Domain field equal to the source address domain, and a Destination Local Address field equal to the source host local address.

After translating either the destination address, the source address, or both addresses in the packet, the NAT forwards the translated packet to the destination host over the destination address domain.

The network address translations described above can be demonstrated by example. Two examples are set forth below. The first example follows the network address translations of a packet sent by the host X 110 to the host Y 120 and a corresponding response packet sent by the host Y 120 back to the host X 110. The second example follows the network address translations of a packet sent by the host X 110 to the host B 140 and a corresponding response packet sent by the host B 140 back to the host X 110. In these examples, it is assumed that the host X 110 has obtained the destination address using domain name resolution or some other means. For convenience, the convention (S, D) is used to indicate a packet having source address S and destination address D.

Figure 7:
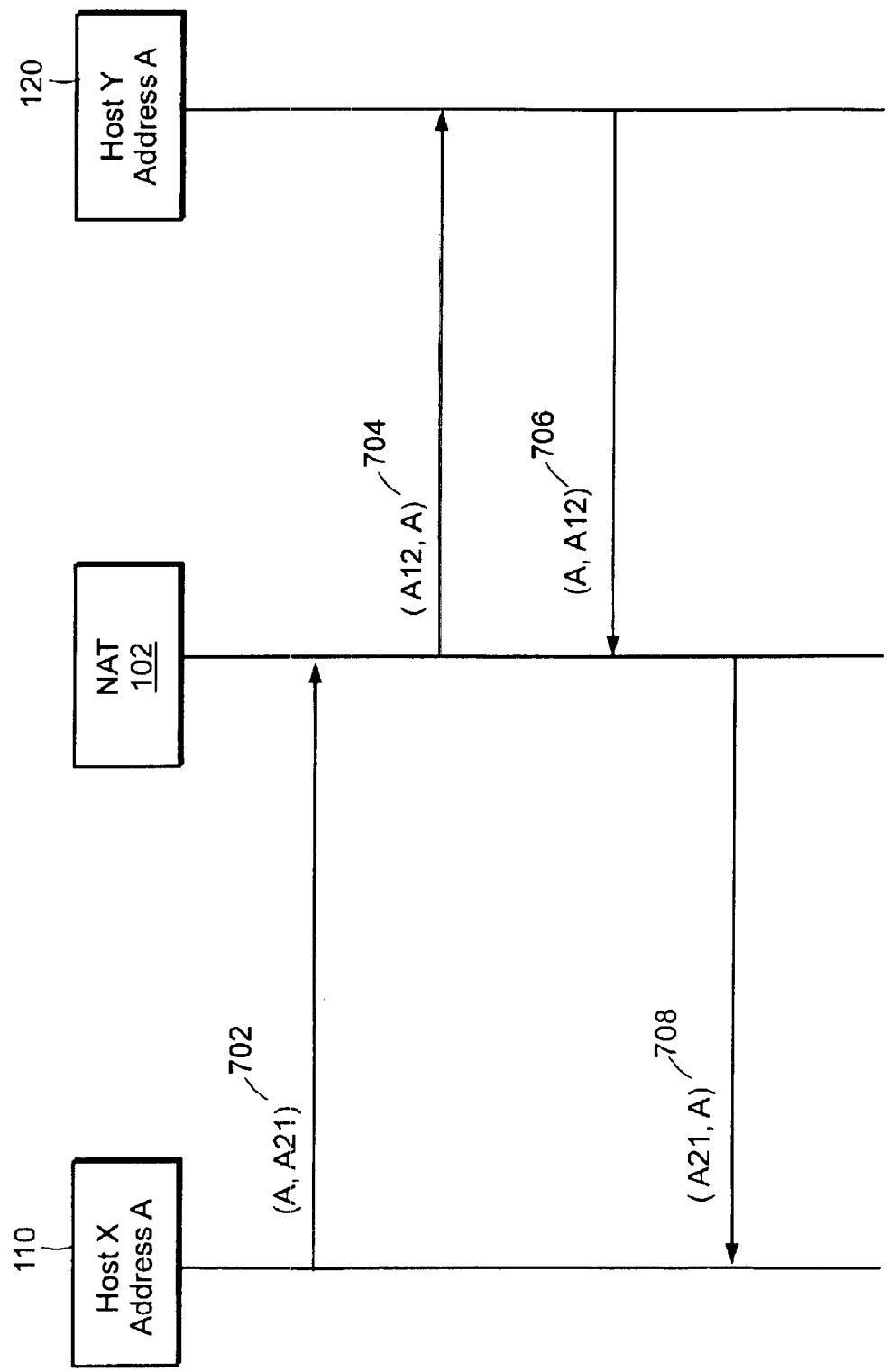
FIG. 7 is a message flow diagram showing an exemplary message flow for a first exemplary embodiment of the present invention.

FIG. 7 is a message flow diagram showing an exemplary packet exchange between the host X 110 in the address domain 1 and the host Y 120 in the address domain 2. The host X 110 transmits the packet 702 including, as the source address, the host X local address (i.e., A), and, as the destination address, the host Y global address for address domain 1 (i.e., A21). The host Y global address A21 uniquely identifies the host Y 120 within the communication network 100. However, the host X local address A is ambiguous within the communication network 100, since it does not uniquely identify the host X 110.

Upon receiving the packet 702, the NAT 102 determines that both the source address and the destination address require address translation. In order to translate the destination address, the NAT 102 uses the destination address translation table shown in FIG. 2D to find the destination address translation table entry 226 corresponding to the destination address A21, and obtains therefrom the host Y local address A. In order to translate the source address, the NAT 102 obtains the destination address domain from the destination address translation table entry 226 (i.e., address domain 2), and also determines the source address domain (i.e., address domain 1) either implicitly based upon the interface over which the packet 702 is received or explicitly from the destination address translation table entry 226. The source address domain indicates the particular source address translation table required for the source address translation, which, in this example, is the source address translation table for address domain 1 shown in FIG. 2A. The NAT 102 finds the source address translation table entry 202 corresponding to the host X local address for destination (outbound) address domain 2, and obtains therefrom the host X global address for address domain 2 (i.e., A12). The NAT 102 then formats the packet 704 including, as the source address, the host X global address for address domain 2 (i.e., A12), and, as the destination address, the host Y local address (i.e., A). The NAT 102 forwards the packet 704 to the host Y 120 over the address domain 2.

Upon receiving the packet 704, the host Y 120 may transmit a response packet 706 including, as the source address, the host Y local address (i.e., A), and, as the destination address, the host X global address for address domain 2 (i.e., A12), typically copied from the source address of the packet 704. The host X global address A12 uniquely identifies the host X 110 within the communication network 100. However, the host Y local address A is ambiguous within the communication network 100, since it does not uniquely identify the host Y 120.

Upon receiving the packet 706, the NAT 102 determines that both the source address and the destination address require address translation. In order to translate the destination address, the NAT 102 uses the destination address translation table shown in FIG. 2D to find the destination address translation table entry 220 corresponding to the destination address A12, and obtains therefrom the host X local address A. In order to translate the source address, the NAT 102 obtains the destination address domain from the destination address translation table entry 220 (i.e., address domain 1), and also determines the source address domain (i.e., address domain 2) either implicitly based upon the interface over which the packet 706 is received or explicitly from the destination address translation table entry 220. The source address domain indicates the particular source address translation table required for the source address translation, which, in this example, is the source address translation table for address domain 2 shown in FIG. 2B. The NAT 102 finds the source address translation table entry 208 corresponding to the host Y local address for destination (outbound) address domain 1, and obtains therefrom the host Y global address for address domain 1 (i.e., A21). The NAT 102 then formats the packet 708 including, as the source address, the host Y global address for address domain 1 (i.e., A21), and, as the destination address, the host X local address (i.e., A). The NAT 102 forwards the packet 708 to the host X 110 over the address domain 1.

Figure 8:
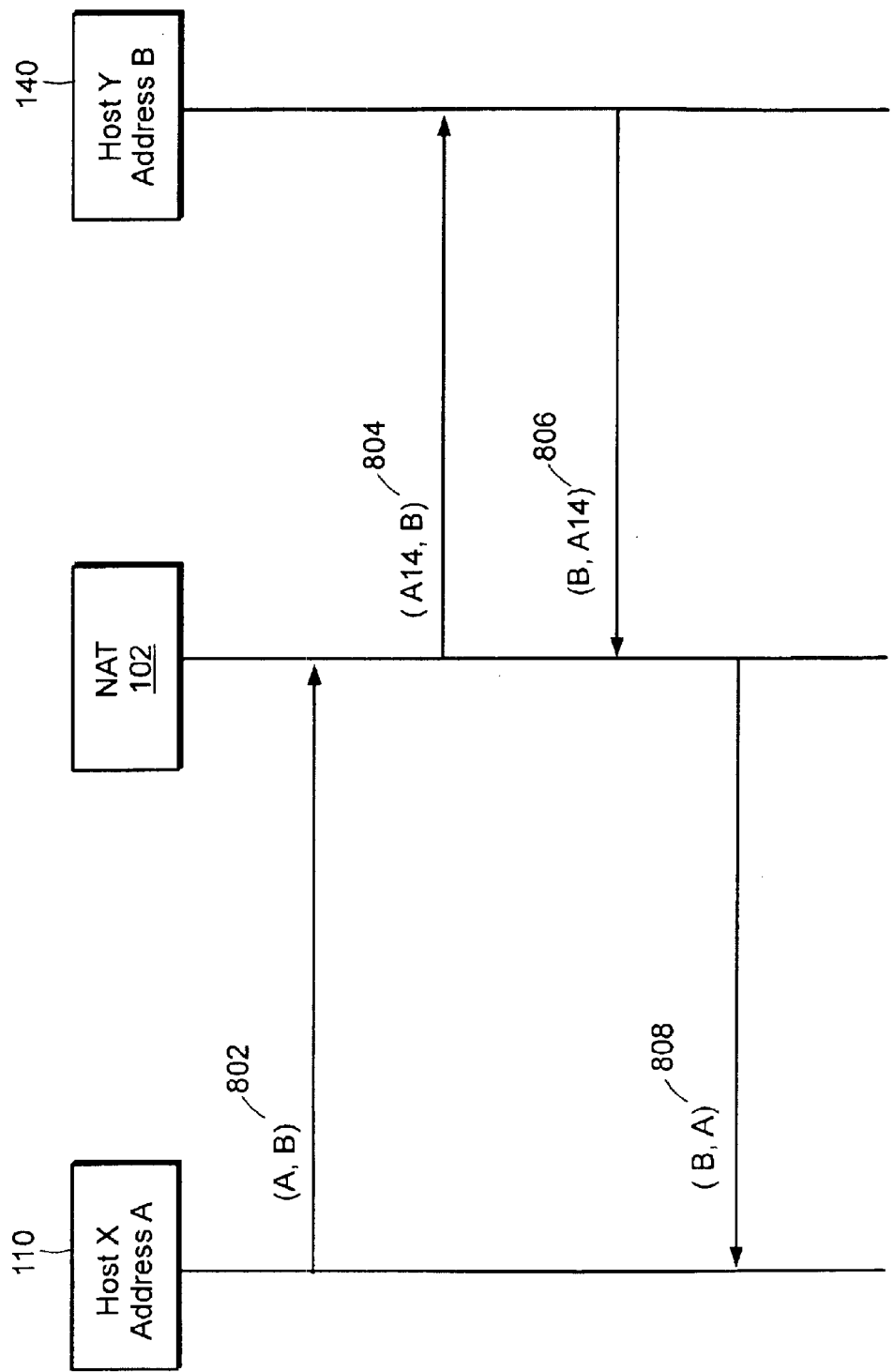
FIG. 8 is a message flow diagram showing an exemplary message flow for a second exemplary embodiment of the present invention.

FIG. 8 is message flow diagram showing an exemplary packet exchange between the host X 110 in the address domain 1 and the host B 140 in the address domain 4. The host X 110 transmits the packet 802 including, as the source address, the host X local address (i.e., A), and, as the destination address, the host B network address (i.e., B). The host B network address B uniquely identifies the host B 140 within the communication network 100. However, the host X local address A is ambiguous within the communication network 100, since it does not uniquely identify the host X 110.

Upon receiving the packet 802, the NAT 102 determines that only the source address requires address translation. In order to translate the source address, the NAT 102 determines the destination address domain, for example, by finding the destination address translation table entry 238 in the destination address translation table, and obtaining therefrom the destination (outbound) domain (i.e., address domain 4). The NAT 102 also determines the source address domain (i.e., address domain 1) implicitly based upon the interface over which the packet 502 is received (there is no explicit source address domain associated with the network address B). The source address domain indicates the particular source address translation table required for the source address translation, which, in this example, is the source address translation table for address domain 1 shown in FIG. 2A. The NAT 102 finds the source address translation table entry 206 corresponding to the host X local address for destination (outbound) address domain 4, and obtains therefrom the host X global address for address domain 4 (i.e., A14). The NAT 102 then formats the packet 804 including, as the source address, the host X global address for address domain 4 (i.e., A14), and, as the destination address, the host B network address (i.e., B). The NAT 102 forwards the packet 804 to the host B 140 over the address domain 4.

Upon receiving the packet 804, the host B 140 may transmit a response packet 806 including, as the source address, the host B network address (i.e., B), and, as the destination address, the host X global address for address domain 4 (i.e., A14), typically copied from the source address of the packet 804. The host X global address A14 uniquely identifies the host X 110 within the communication network 100. The host B network address B is unambiguous within the communication network 100.

Upon receiving the packet 806, the NAT 102 determines that only the destination address requires address translation. In order to translate the destination address, the NAT 102 uses the destination address translation table shown in FIG. 2D to find the destination address translation table entry 224 corresponding to the destination address A14, and obtains therefrom the host X local address A. The NAT 102 then formats the packet 808 including, as the source address, the host B network address B, and, as the destination address, the host X local address A. The NAT 102 forwards the packet 808 to the host X 110 over the address domain 1.

Figure 9:
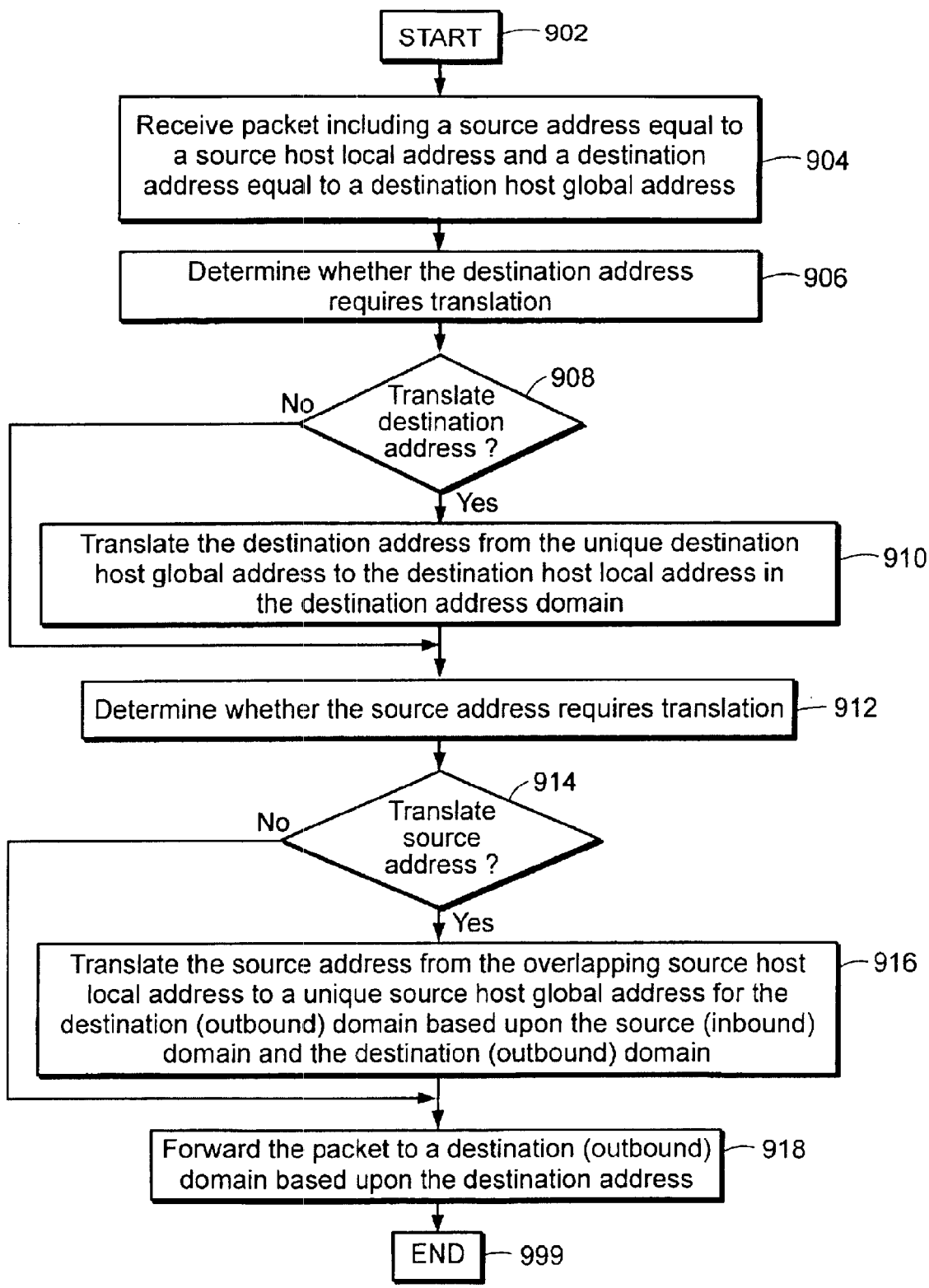
FIG. 9 is a logic flow diagram showing exemplary network address translator logic for performing network address translation on a packet in accordance with an embodiment of the present invention.

FIG. 9 is a logic flow diagram showing exemplary NAT 102 logic for processing a packet received from the source host. Beginning in step 902, the NAT 102 receives from the source host a packet including a source address equal to a source host local address and a destination address equal to a destination host global address, in step 904. The destination host global address is, by definition, a unique address within the communication network 100, although the destination host global address may or may not need to be translated into a destination host local address in the destination address domain. The source host local address may be either a unique address within the communication network 100 or an overlapping address that needs to be translated into a source host global address for the destination address domain.

Therefore, upon receiving the packet in step 904, the NAT 102 determines whether the destination address requires translation, in step 906. If the destination address requires translation (YES in step 908), then the NAT 102 translates the destination address from the unique destination host global address to the destination host local address in the destination address domain, in step 910, as described in detail with respect to FIG. 10A below.

Whether or not the destination address requires translation, the NAT 102 also determines whether the source address requires translation, in step 912. If the source address requires translation (YES in step 914), then the NAT 102 translates the source address from the overlapping source host local address to the unique source host global address for the destination address domain, in step 916, as described in detail with respect to FIG. 10B below.

After performing any required address translations, the NAT 102 forwards the translated packet into the destination address domain, in step 918. The NAT 102 logic terminates in step 999.

Figure 10A:
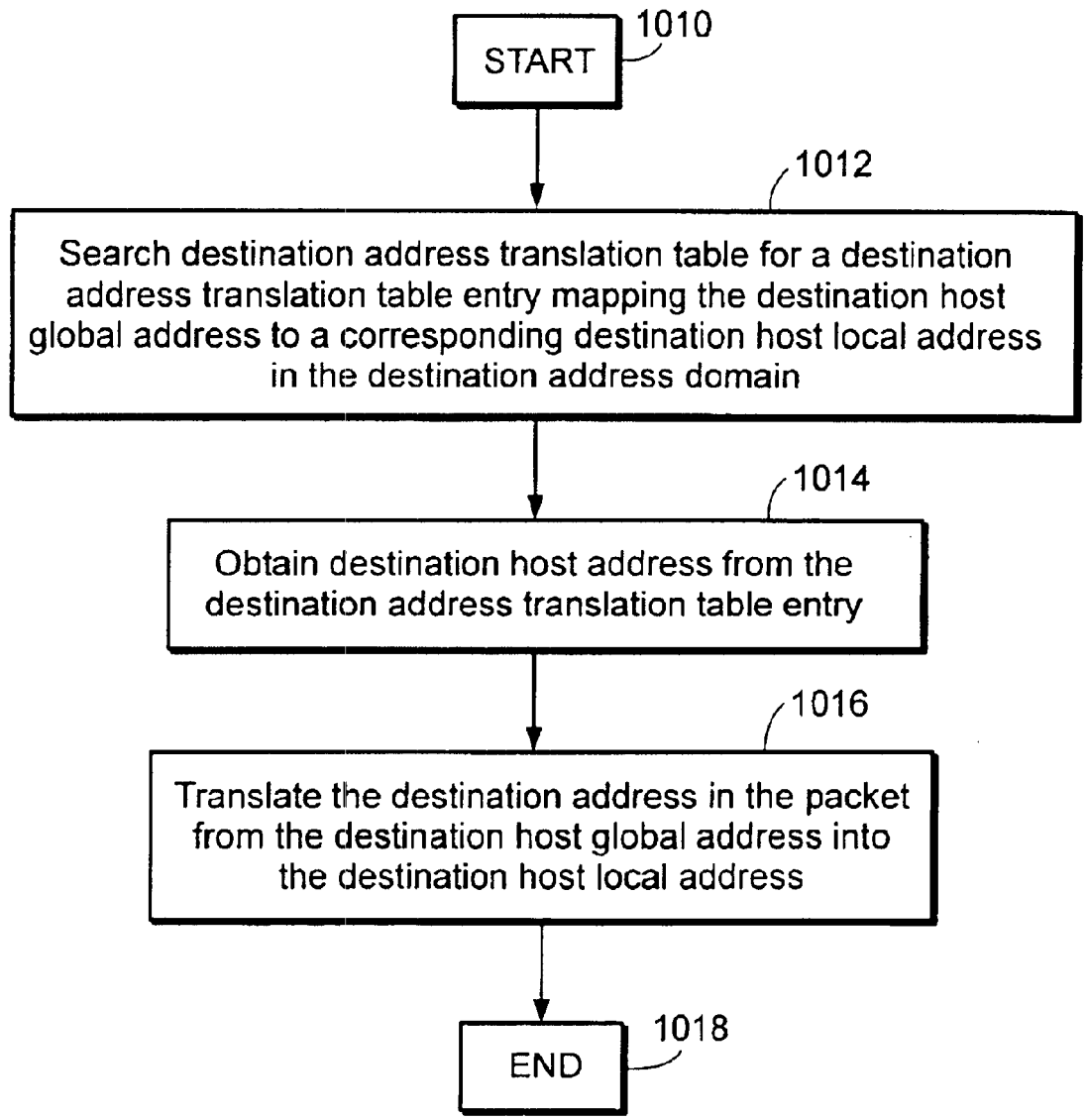
FIG. 10A is a logic flow diagram showing exemplary destination address translation logic for translating a destination address from a destination host global address into a destination host local address in a destination (outbound) address domain in accordance with an embodiment of the present invention.

FIG. 10A is a logic flow diagram showing exemplary NAT 102 destination address translation logic 910 in a preferred embodiment of the present invention. Beginning in step 1010, the NAT 102 searches the destination address translation table for a destination address translation table entry corresponding to the destination host global address, in step 1012, specifically be searching the destination address translation table for a destination address translation table entry having a Destination Global Address field equal to the destination host global address. Upon finding the destination address translation table entry in step 1012, the NAT 102 obtains the destination host local address from the destination address translation table entry, in step 1014, specifically by obtaining the destination host local address from the Destination Local Address field of the destination address translation table entry. Upon obtaining the destination host local address in step 1014, the NAT 102 translates the destination address in the packet from the destination host global address into the destination host local address, in step 1016. The destination address translation logic terminates in step 1018.

Figure 10B:
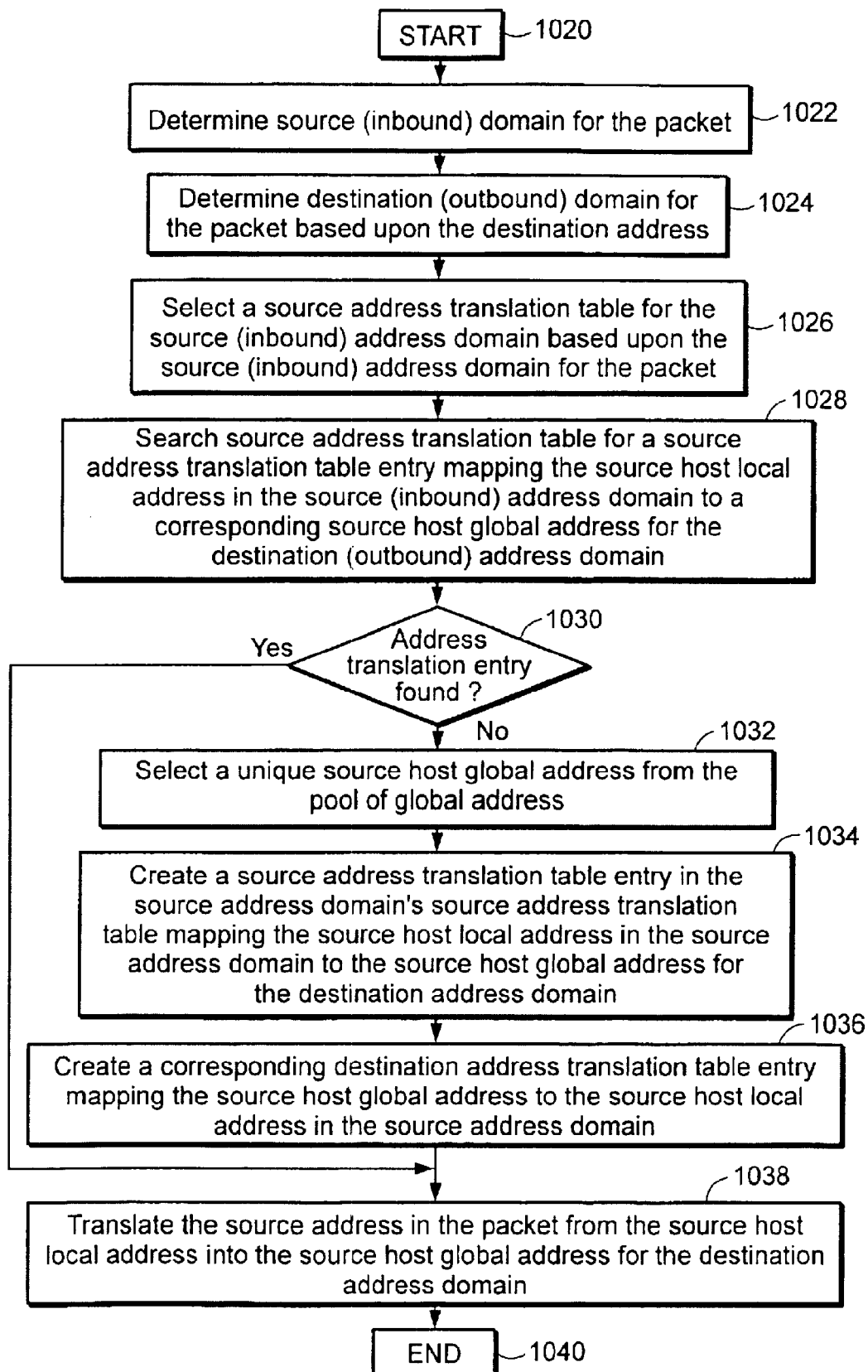
FIG. 10B is a logic flow diagram showing exemplary source address translation logic for translating a source address from a source host local address into a source host global address for the destination (outbound) address domain in accordance with an embodiment of the present invention.

FIG. 10B is a logic flow diagram showing exemplary NAT 102 source address translation logic 916 in a preferred embodiment of the present invention. Beginning in step 1020, the NAT 102 determines the source (inbound) domain for the packet, in step 1022, for example, based upon the Source Address Domain field of the destination address translation table entry or the NAT 102 network interface over which the packet was received. The NAT 102 also determines the destination (outbound) domain for the packet based upon the destination address in the packet, in step 1024, typically as part of the preceding destination address translation. Assuming that the NAT 102 maintains a separate source address translation table for each overlapping address domain, the NAT 102 proceeds to select a source address translation table for the source (inbound) domain, in step 1026, based upon the source (inbound) domain for the packet determined in step 1022. The NAT 102 then searches the source address translation table for a source address translation table entry mapping the source host local address in the source (inbound) address domain to the source host global address for the destination (outbound) address domain, in step 1028, specifically by searching the source address translation table for a source address translation table entry having a Source Local Address field equal to the source host local address and a Destination Address Domain field equal to the destination (outbound) domain determined in step 1024.

If the source address translation table entry is found (YES in step 1030), then the NAT 102 proceeds to translate the source address in the packet from the source host local address into the source host global address for the destination (outbound) address domain, in step 1038. In particular, the NAT 102 obtains the source host global address from the Source Global Address field of the source address translation table entry, and replaces the source host local address in the packet with the source host global address. The source address translation logic then terminates in step 1040.

However, if the source address translation table entry is not found (NO in step 1030), then the NAT 102 dynamically allocates a source host global address for the destination address domain, creates the appropriate address translation entries, and translates the source address in the packet by replacing the source host local address in the packet with the dynamically allocated source host global address. In particular, the NAT 102 first selects a unique source host global address from a pool of network addresses, in step 1032. The NAT 102 then creates a source address translation table entry in the source (inbound) address domain's source address translation table mapping the source host local address in the source (inbound) address domain to the source host global address for the destination (outbound) address domain, in step 1034, and creates a corresponding destination address translation table entry in the destination address translation table mapping the source host global address to the source host local address in the source (inbound) address domain, in step 1036. The NAT 102 then translates the source address in the packet from the source host local address into the source host global address for the destination (outbound) address domain, in step 1038, specifically by replacing the source host local address in the packet with the source host global address. The source address translation logic then terminates in step 1040.

Figure 11A:
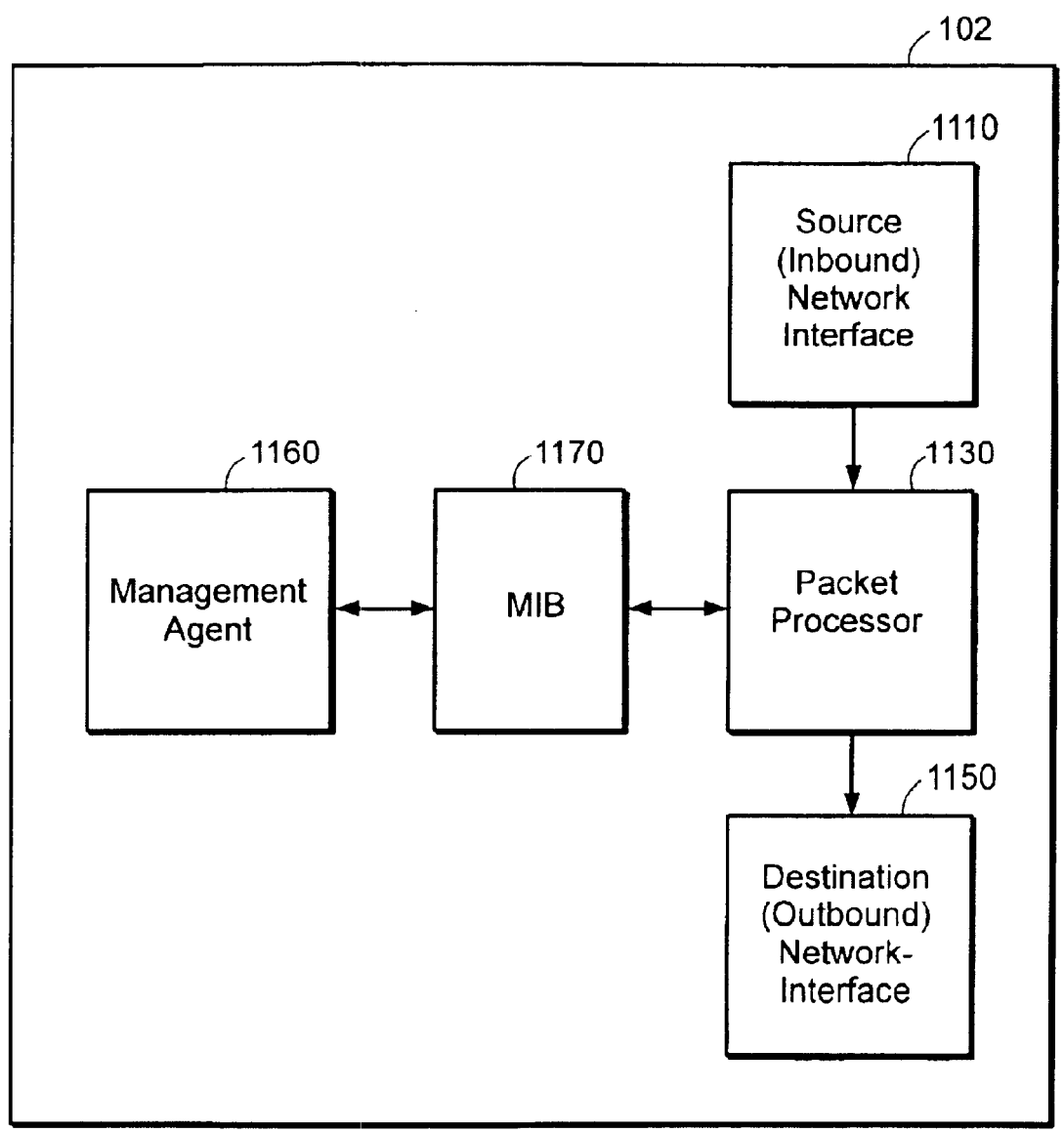
FIG. 11A is a block diagram showing the relevant logic blocks of an exemplary network address translator in accordance with an embodiment of the present invention.

FIG. 11A is a block diagram showing the relevant logic blocks of an exemplary NAT 102. The NAT 102 is operably coupled to at least a source (inbound) address domain of the communication network 100 by way of a Source (Inbound) Network Interface 1110 and to a destination (outbound) address domain of the communication network 100 by way of a Destination (Outbound) Network Interface 1150. Packets received over the Source (Inbound) Network Interface 1110 are processed by a Packet Processor 1130. The Packet Processor 1130 is operably coupled to perform any necessary address translations on the packet. The translated packets are forwarded to the destination (outbound) address domain via the Destination (Outbound) Network Interface 1150.

FIG. 11B shows the relevant logic blocks of an exemplary Packet Processor 1130. The Packet processor 1130 includes both destination address translation logic (1136, 1137) and source address translation logic (1132, 1133). The destination address translation logic translates a destination host global address into a destination host local address in the destination (outbound) address domain, if such a translation is determined to be required. The source address translation logic translates a source host local address in the source (inbound) address domain into a source host global address for the destination (outbound) address domain, if such a translation is determined to be required. It should be noted that the destination address translation logic and the source address translation logic are shown as being operably coupled in parallel for convenience only. In a preferred embodiment of the present invention, the source address translation logic operates after completion of the destination address translation logic, and preferably obtains the source (inbound) address domain and the destination (outbound) address domain from the destination address translation table entry that is used by the destination address translation logic for translating the destination address in the packet.

The destination address translation logic determines whether the destination address requires translation, and translates the destination address from a destination host global address into a destination host local address if destination address translation is required. Specifically, the packet is processed by a Destination Address Filter 1136, which determines whether or not the destination address in the packet requires translation. The Destination Address Filter 1136 may utilize address translation information stored in the Address Translation Table(s) 1134, and particularly in a destination address translation table, in order to determine whether or not the destination address in the packet requires translation. If the Destination Address Filter 1136 determines that the destination address in the packet does not require address translation, then the Destination Address Filter 1136 forwards the packet unchanged via the path 1138. However, assuming that the Destination Address Filter 1136 determines that the destination address in the packet does require address translation, then the Destination Address Translator 1137 translates the destination address from the destination host global address into the destination host local address in the destination (outbound) address domain, specifically by finding a destination address translation table entry in the Address Translation Table(s) 1134 corresponding to the destination host global address, obtaining the destination host local address from the destination address translation table entry, and inserting the destination host local address into the destination address field of the packet.

The source address translation logic determines whether the source address requires translation, and translates the source address from a source host local address into a source host global address for the destination (outbound) address domain if source address translation is required. Specifically, the packet is processed by a Source Address Filter 1132, which determines whether or not the source address in the packet requires translation. The Source Address Filter 1132 may utilize address translation information stored in the Address Translation Table(s) 1134 to determine whether or not the source address in the packet requires translation. If the Source Address Filter 1132 determines that the source address in the packet does not require address translation, then the Source Address Filter 1132 forwards the packet unchanged via the path 1131. However, assuming that the Source Address Filter 1132 determines that the source address in the packet does require address translation, then the Source Address Translator 1133 translates the source address from the source host local address into the source host global address for the destination (outbound) address domain, specifically by selecting a source address translation table for the source (inbound) address domain, searching the source address translation table for a source address translation table entry corresponding to the source host local address and the destination (outbound) address domain, obtaining the source host global address from the source address translation table entry, and inserting the source host global address into the source address field of the packet.

In an exemplary embodiment of the invention, the Packet Processor 1130 is managed through a Management Information Base (MIB) 1170, which is accessible through a Management Agent 1160 such as a Simple Network Management Protocol (SNMP) agent. The MIB 1170 defines various management objects for configuring and controlling various network address translation functions. Specifically, an exemplary MIB 1170 defines management objects for configuring and controlling the set of interfaces that participate in network address translation, configuring and controlling ranges of addresses to be translated, configuring and controlling ranges of addresses for address pools, configuring and controlling static address mappings, and monitoring the current set of address translations that are in effect. It should be noted that the MIB 1170 is an abstraction for management information and that the management objects defined by the MIB 1170 do not necessarily correspond to any particular management information or management information format maintained within the NAT 102.

Figures 1, 12B:
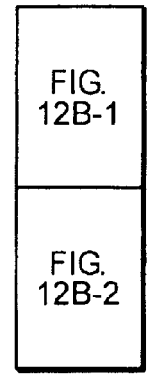

An exemplary MIB 1170 for configuring and controlling the Packet Processor 1130 is shown in FIGS. 12A–12P, and is included herein for convenience.

The MIB 1170 defines various management objects that are organized as tables within the MIB 1170. Specifically, the MIB 1170 defines a NAT interface table (wfNatIfTable), a NAT address range table (wfNatAddressRangeTable), a NAT static mapping table (wfNatStaticMappingTable), and a NAT mapping table (wfNatMappingTable).

The NAT interface table (wfNatIfTable) is used to configure and control the set of interfaces that are participating in network address translation. Each NAT interface table entry corresponds to a particular NAT interface, and includes a management object (wfNatIfDelete) to create or delete the table entry, a management object (wfNatIfDisable) to enable or disable the table entry, a management object (wfNatIfIpAddress) indicating an IP address for the interface, a management object (wfNatIfCircuit) indicating a circuit number for the interface, a management object (wfNatIfType) indicating the interface type (unidirectional inbound, unidirectional outbound, bi-directional), a management object (wfNatIfState) indicating the interface state (up, down, init), a management object (wfNatIfTxCount) indicating the number of packets mapped over the interface from the local to the global network, a management object (wfNatIfRxCount) indicating the number of packets mapped over the interface from the global to the local network, a management object (wfNatIfPktDropCount) indicating the number of packets dropped on the interface, and a management object (wfNatIfDomain) indicating the address domain for the interface if the interface is configured as a bi-directional interface (i.e., wfNatIfType indicates bi-directional).

The NAT address range table (wfNatAddressRangeTable) is used to configure and control various address ranges. Different types of address ranges can be defined using the NAT address range table. One type of address range, referred to as a source address filter, defines a range of IP addresses that is used to detect packets that require traditional NAT forwarding. Another type of address range, referred to as a translation pool, defines a range of IP addresses from which translation addresses are selected for traditional NAT forwarding. Still another type of address range, referred to as a domain-specific source address filter, defines a range of IP addresses that is used to detect packets that require domain-specific NAT forwarding. Yet another type of address range, referred to as a domain-specific translation pool, defines a range of IP addresses from which translation addresses are selected for domain-specific NAT forwarding. It should be noted that, although the MIB 1170 uses a single table structure to define multiple types of address ranges, the NAT address range table does not necessarily map to any one or more tables stored within the NAT 102.

Each address range is defined by a beginning IP address and a prefix length indicating the number of contiguous bits set in the IP address mask that is used to define the address range. Each source address filter range includes, among other things, an N-to-1 translation address. Each domain-specific range (i.e., domain-specific source address filter and domain-specific translation pool) includes, among other things, a domain name indicating the domain associated with the address range. Each domain-specific source address filter range additionally includes, among other things, a translation pool indicator indicating a domain-specific translation pool to be used for domain-specific address translations, and specifically indicating whether to use a domain-specific translation pool associated with the inbound or the outbound domain.

Thus, each NAT address range table entry defines an address range, and includes a management object (wfNatAddressRangeDelete) to create or delete the table entry, a management object (wfNatAddressRangeDisable) to enable or disable the table entry, a management object (wfNatAddressRangeAddress) indicating the beginning IP address for the address range, a management object (wfNatAddressRangePrefixLen) indicating the prefix length (i.e., the number of contiguous bits set in the IP address mask that are used to define the address range), a management object (wfNatAddressRangeIndex) indicating a unique value (index) for the table entry, a management object (wfNatAddressRangeNto1Addr) indicating an N-to-1 translation address if the address range type (i.e., wfNatAddressRangeType, described below) is source address filter, a management object (wfNatAddressRangeType) indicating the address range type (source address filter, translation pool, domain-specific source address filter, domain-specific translation pool, a management object (wfNatAddressRangeDomain) indicating an address domain for the address range if the address range type (i.e., wfNatAddressRangeType) is source address filter or translation pool, a management object (wfNatAddressRangeTransPool) indicates whether to obtain translation addresses from a translation pool defined for the inbound domain or from a translation pool defined for the outbound domain if the address range type (i.e., wfNatAddressRangeType) is domain-specific source address filter, a management object (wfNatAddressRangeStaticNextHop) indicating the IP address of the next hop for the address range, and a management object (wfNatAddressRangeUnnumCct) indicating whether the address range is associated with an unnumbered interface.

The NAT static mapping table (wfNatStaticMappingTable) is used to configure and control static translation mappings. Each NAT static mapping table entry represents a single static translation mapping, and includes a management object (wfNatStaticMappingDelete) to create or delete the table entry, a management object (wfNatStaticMappingDisable) to enable or disable the table entry, a management object (wfNatStaticMappingOrigAddress) indicating the original (un-translated) address for the translation, a management object (wfNatStaticMappingTransAddress) indicating the translated address for the translation, a management object (wfNatStaticMappingProtocol) indicating the IP protocol (e.g., TCP, UDP) for the translation, a management object (wfNatStaticMappingOrigPort) indicating the original (UDP or TCP) port for the translation, a management object (wfNatStaticMappingTransPort) indicating the translated (UDP or TCP) port for the translation, a management object (wfNatStaticMappingInDomain) indicating the inbound domain for the translation, a management object (wfNatStaticMappingOutDomain) indicating the outbound domain for the translation, a management object (wfNatStaticMappingStaticNextHop) indicating the IP address of the next hop for the translation entry, and a management object (wfNatStaticMappingUnnumCct) indicating whether the address range is associated with an unnumbered interface.

The NAT mapping table (wfNatMappingTable) is used to monitor the current set of address translations that are in effect. Each NAT mapping table entry represents a particular address translation, and includes a management object (wfNatMappingOrigAddress) the original (un-translated) address of the translation, a management object (wfNatMappingTransAddress) indicating the translated address of the translation, a management object (wfNatMappingProtocol) indicating the IP protocol of the translation, a management object (wfNatMappingOrigPort) indicating the original (UDP or TCP) port for the translation, a management object (wfNatMappingTransPort) indicating the translated (UDP or TCP) port for the translation), a management object (wfNatMappingTxCount) indicating the number of packets forwarded by the NAT using the translation, a management object (wfNatMappingRxCount) indicating the number of packets received by the NAT using the translation, a management object (wfNatMappingTimeout) indicating the amount of time (in seconds) since the translation was last used, a management object (wfNatMappingMode) indicating the source of the translation (locally originated and owned, remotely originated and owned, remotely originated and locally owned) and the type of translation (static, dynamic 1-to-1, N-to-1), a management object (wfNatMappingInDomain) indicating the inbound domain for the translation, and a management object (wfNatMappingOutDomain) indicating the outbound domain for the translation.

Management information that is configured using the MIB 1170 is used to set up address translation entries in the address translation table(s) 1134, which are then used within the Packet Processor 1130 for performing domain-specific network address translation.

While the exemplary MIB 1170 uses a beginning address and prefix length to define an address range, the present invention is in no way limited to using a beginning address and prefix length to define an address range. There are many other ways to define an address range. For one example, an address range can be defined using a beginning address and an ending address for the address range, in which case a MIB would include a management object for defining the beginning address and a management object for defining the ending address. For another example, an address range can be defined using a beginning address and an address range size indicating the number of addresses in the address range, in which case a MIB would include a management object for defining the beginning address and a management object for defining the address range size. Other ways to define an address range using MIB management objects will become apparent to a skilled artisan. All such way to define an address range using MIB management objects fall within the scope of the present invention as claimed below.

Furthermore, an address range is not limited to a number of contiguous addresses. An address range may include one or more non-contiguous addresses, in which case a MIB would include management objects for defining the individual addresses and/or groups of addresses in an address range. For example, a MIB may include management objects for entering individual addresses in the address range.

It should be noted that the term "router" is used herein to describe a communication device that may be used in a communication system, and should not be construed to limit the present invention to any particular communication device type. Thus, a communication device may include, without limitation, a bridge, router, bridge-router (brouter), switch, node, or other communication device.

It should also be noted that the term "packet" is used herein to describe a communication message that may be used by a communication device (e.g., created, transmitted, received, stored, or processed by the communication device) or conveyed by a communication medium, and should not be construed to limit the present invention to any particular communication message type, communication message format, or communication protocol. Thus, a communication message may include, without limitation, a frame, packet, datagram, user datagram, cell, or other type of communication message.

It should also be noted that the logic flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or nay other means including any combination thereof. In a typical embodiment of the present invention, predominantly all of the management agent logic 1160 and MIB 1170 is implemented as a set of computer program instructions that is converted into a computer executable form, stored as such in a computer readable medium, and executed by a microprocessor within the NAT 102 under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The computer program may be fixed in any form in a signal that is transmittable to a computer using any of various communication technologies, including, but in no way limited to, analog technologies, digital technologies, optical technologies, wireless technologies, networking technologies, and inter-networking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies, networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The present invention may be embodied in other specific forms without departing from the true scope of the invention. The described embodiments are to be considered in all respects only as illustrative and not restrictive.

We claim:

1. A management information base for configuring a domain-specific source address filter, the management information base comprising:

at least one management object defining a number of addresses for detecting packets requiring domain-specific network address translation;

a management object defining a domain for said number of addresses; and wherein the management information base is operable to map a given local source address to a different one of a plurality of global addresses for each corresponding one of a plurality of destination address domains.

2. The management information base of claim 1, wherein the at least one management object comprises:

a first management object defining a beginning address for a range of addresses; and a second management object defining a prefix length indicating a number of contiguous bits in an address mask.

3. The management information base of claim 1, wherein the at least one management object comprises:

a first management object defining a beginning address for a range of addresses; and a second management object defining an ending address for the range of addresses.

4. The management information base of claim 1, wherein the at least one management object comprises:

a first management object defining a beginning address for a range of addresses; and a second management object defining an address range size indicating a number of addresses in the range of addresses.

5. The management information base of claim 1, wherein the at least one management object comprises:

a management object for including an individual address in the number of addresses.

6. The management information base of claim 1, further comprising:

a management object defining a domain-specific translation pool for translating said packets requiring domain-specific network address translation.

7. The management information base of claim 6, wherein the domain-specific translation pool is associated with one of an inbound domain and an outbound domain, and wherein the management object defining the domain-specific translation pool indicates one of an inbound domain translation pool and an outbound domain translation pool.

8. A management information base for configuring a domain-specific translation pool, the management information base comprising:

at least one management object defining a number of addresses in the domain-specific translation pool;

a management object defining a domain for said number of addresses; and wherein the management information base is operable to map a given local source address to a different one of a plurality of global addresses for each corresponding one of a plurality of destination address domains.

9. The management information base of claim 8, wherein the at least one management object comprises:

a first management object defining a beginning address for a range of addresses; and a second management object defining a prefix length indicating a number of contiguous bits in an address mask.

10. The management information base of claim 8, wherein the at least one management object comprises:

a first management object defining a beginning address for a range of addresses; and a second management object defining an ending address for the range of addresses.

11. The management information base of claim 8, wherein the at least one management object comprises:

a first management object defining a beginning address for a range of addresses; and a second management object defining an address range size indicating a number of addresses in the range of addresses.

12. The management information base of claim 8, wherein the at least one management object comprises:

a management object for including an individual address in the number of addresses.

13. A management information base for configuring address ranges in a multi-domain network address translator, the management information base comprising:

a management object (wfNatAddressRangeDelete) to create or delete a table entry;

a management object (wfNatAddressRangeDisable) to enable or disable the table entry;

a management object (wfNatAddressRangeAddress) indicating a beginning address for the address range;

a management object (wfNatAddressRangePrefixLen) indicating a prefix length;

a management object (wfNatAddressRangeIndex) indicating a unique value (index) for the table entry;

a management object (wfNatAddressRangeNto1Addr) indicating an N-to-1 translation address for a source address filter;

a management object (wfNatAddressRangeType) indicating an address range type equal to one of source address filter, translation pool, domain-specific source address filter, and domain-specific translation pool;

a management object (wfNatAddressRangeDomain) indicating an address domain for the address range if the address range type (i.e., wfNatAddressRangeType) is one of domain-specific source address filter and domain-specific translation pool;

a management object (wfNatAddressRangeTransPool) indicating a domain-specific translation pool for the address range if the address range type (i.e., wfNatAddressRangeType) is domain-specific source address filter;

a management object (wfNatAddressRangeStaticNextHop) indicating an address of a next hop for the address range; and a management object (wfNatAddressRangeUnnumCct) indicating whether the address range is associated with an unnumbered interface.

14. An apparatus for multi-domain network address translation, the apparatus comprising:

a management agent; and a management information bases accessible through the management agent wherein the management information base comprises:

at least one management object defining a number of addresses for detecting packets requiring domain-specific network address translation;

a management object defining a domain for said number of addresses; and wherein the apparatus is operable to map a given local source address to a different one of a plurality of global addresses for each corresponding one of a plurality of destination address domains.

15. The apparatus of claim 14, wherein the at least one management object comprises:

a first management object defining a beginning address for a range of addresses; and a second management object defining a prefix length indicating a number of contiguous bits in an address mask.

16. The apparatus of claim 14, wherein the at least one management object comprises:

a first management object defining a beginning address for a range of addresses; and a second management object defining an ending address for the range of addresses.

17. The apparatus of claim 14, wherein the at least one management object comprises:

a first management object defining a beginning address for a range of addresses; and a second management object defining an address range size indicating a number of addresses in the range of addresses.

18. The apparatus of claim 14, wherein the at least one management object comprises:

a management object for including an individual address in the number of addresses.

19. The apparatus of claim 14, further comprising:

a management object defining a domain-specific translation pool for translating said packets requiring domain-specific network address translation.

20. The apparatus of claim 19, wherein the domain-specific translation pool is associated with one of an inbound domain and an outbound domain, and wherein the management object defining the domain-specific translation pool indicates one of an inbound domain translation pool and an outbound domain translation pool.

21. An apparatus for multi-domain network address translation, the apparatus comprising:

a management agent; and a management information base accessible through the management agent, wherein the management information base comprises:

at least one management object defining a number of addresses in a domain-specific translation pool for translating packet requiring domain-specific network address translation;

a management object defining a domain for said number of addresses; and wherein the apparatus is operable to map a given local source address to a different one of a plurality of global addresses for each corresponding one of a plurality of destination address domains.

22. The apparatus of claim 21, wherein the at least one management object comprises:

a first management object defining a beginning address for a range of addresses; and a second management object defining a prefix length indicating a number of contiguous bits in an address mask.

23. The apparatus of claim 21, wherein the at least one management object comprises:

a first management object defining a beginning address for a range of addresses; and a second management object defining an ending address for the range of addresses.

24. The apparatus of claim 21, wherein the at least one management object comprises:

a first management object defining a beginning address for a range of addresses; and a second management object defining an address range size indicating a number of addresses in the range of addresses.

25. The apparatus of claim 21, wherein the at least one management object comprises a management object for including an individual address in the number of addresses.

26. A management information base for configuring an interface for multi-domain network address translation, the management information base comprising:

at least one management object defining the interface;

a management object defining a domain for the interface; and wherein the management information base is operable to map a given local source address to a different one of a plurality of global addresses for each corresponding one of a plurality of destination address domains.

27. The management information base of claim 26, wherein the at least one management object defining the interface comprises:

a management object defining an address for the interface.

28. The management information base of claim 26, wherein the at least one management object defining the interface comprises:

a management object defining a circuit for the interface.

29. The management information base of claim 26, wherein the at least one management object defining the interface comprises:

a management object defining an interface type for the interface.

30. The management information base of claim 29, wherein the interface type is one of a unidirectional inbound interface type, a unidirectional outbound interface type, and a bi-directional interface type.

31. A management information base for configuring an interface for multi-domain network address translation, the management information base comprising:

at least one management object defining the interface;
a management object defining a domain for the interface;
a management object (wfNatIfDelete) to create or delete the table entry;
a management object (wfNatIfDisable) to enable or disable the table entry;
a management object (wfNatIfIpAddress) indicating an address for the interface;
a management object (wfNatIfCircuit) indicating a circuit number for the interface;
a management object (wfNatIfType) indicating an interface type equal to one of unidirectional inbound, unidirectional outbound, and bi-directional;
a management object (wfNatIfState) indicating an interface state;
a management object (wfNatIfTxCount) indicating a number of packets mapped over the interface from a local to a global network;
a management object (wfNatIfRxCount) indicating a number of packets mapped over the interface from a global to a local network;
a management object (wfNatIfPktDropCount) indicating a number of packets dropped on the interface; and
a management object (wfNatIfDomain) indicating an address domain for the interface if the interface is configured as a bi-directional interface.

32. An apparatus for multi-domain network address translation, the apparatus comprising:
a management agent; and
a management information base accessible through the management agent, wherein the management information base comprises:
at least one management object defining the interface;
a management object defining a domain for the interface; and
wherein the management information base is operable to map a given local source address to a different one of a plurality of global addresses for each corresponding one of a plurality of destination address domains.

33. The apparatus of claim 32, wherein the at least one management object defining the interface comprises:
a management object defining an address for the interface.

34. The apparatus of claim 32, wherein the at least one management object defining the interface comprises:
a management object defining a circuit for the interface.

35. The apparatus of claim 32, wherein the at least one management object defining the interface comprises:
a management object defining an interface type for the interface.

36. The apparatus of claim 35, wherein the interface type is one of a unidirectional inbound interface type, a unidirectional outbound interface type, and a bi-directional interface type.

37. An apparatus for multi-domain network address translation, the apparatus comprising:
a management agent; and
a management information base accessible through the management agent, wherein the management information base comprises:
at least one management object defining the interface;
a management object defining a domain for the interface;
a management object (wfNatIfDelete) to create or delete the table entry;
a management object (wfNatIfDisable) to enable or disable the table entry;
a management object (wfNatIfIpAddress) indicating an address for the interface;
a management object (wfNatIfCircuit) indicating a circuit number for the interface;
a management object (wfNatIfType) indicating an interface type equal to one of unidirectional inbound, unidirectional outbound, and bi-directional;
a management object (wfNatIfState) indicating an interface state;
a management object (wfNatIfTxCount) indicating a number of packets mapped over the interface from a local to a global network;
a management object (wfNatIfRxCount) indicating a number of packets mapped over the interface from a global to a local network;
a management object (wfNatIfPktDropCount) indicating a number of packets dropped on the interface; and
a management object (wfNatIfDomain) indicating an address domain for the interface if the interface is configured as a bi-directional interface.

38. A management information base for configuring static address translation mappings for multi-domain network address translation, the management information base comprising:
a management object defining an original address;
a management object defining a translation address for the original address;
a management object defining an inbound domain for multi-domain network address translation of the original address;
a management object defining an outbound domain for multi-domain network address translation of the original address; and
wherein the management information base is operable to map a given local source address to a different one of a plurality of global addresses for each corresponding one of a plurality of destination address domains.

39. A management information base for configuring static address translation mappings for multi-domain network address translation, the management information base comprising:
a management object defining an original address;
a management object defining a translation address for the original address;
a management object defining an inbound domain for multi-domain network address translation of the original address;
a management object defining an outbound domain for multi-domain network address translation of the original address;
a management object (wfNatStaticMappingDelete) to create or delete a table entry;
a management object (wfNatStaticMappingDisable) to enable or disable the table entry;
a management object (wfNatStaticMappingOrigAddress) indicating an original (untranslated) address for the translation;
a management object (wfNatStaticMappingTransAddress) indicating a translated address for the translation;
a management object (wfNatStaticMappingProtocol) indicating a protocol for the translation;

a management object (wfNatStaticMappingOrigPort) indicating an original port for the translation;

a management object (wfNatStaticMappingTransPort) indicating a translated port for the translation;

a management object (wfNatStaticMappingInDomain) indicating the inbound domain for the translation;

a management object (wfNatStaticMappingOutDomain) indicating the outbound domain for the translation;

a management object (wfNatStaticMappingStaticNextHop) indicating an address of a next hop for the translation entry; and a management object (wfNatStaticMappingUnnumCct) indicating whether the table enty is associated with an unnumbered interface.

40. An apparatus for multi-domain network address translation, the apparatus comprising:
    a management agent; and
    a management information base accessible through the management agent, wherein the management information base comprises:
      a management object defining an original address;
      a management object defining a translation address for the original address;
      a management object defining an inbound domain for multi-domain network address translation of the original address;
      a management object defining an outbound domain for multi-domain network address translation of the original address; and
      wherein the management information base is operable to map a given local source address to a different one of a plurality of global addresses for each corresponding one of a plurality of destination address domains.

41. An apparatus for multi-domain network address translation, the apparatus comprising:
    a management agent; and
    a management information base accessible through the management agent, wherein the management information base comprises:
      a management object defining an original address;
      a management object defining a translation address for the original address;
      a management object defining an inbound domain for multi-domain network address translation of the original address;
      a management object defining an outbound domain for multi-domain network address translation of the original address;
      a management object (wfNatStaticMappingDelete) to create or delete a table entry;
      a management object (wfNatStaticMappingDisable) to enable or disable the table entry;
      a management object (wfNatStaticMappingOrigAddress) indicating an original (un-translated) address for the translation;
      a management object (wfNatStaticMappingTransAddress) indicating a translated address for the translation;
      a management object (wfNatStaticMappingProtocol) indicating a protocol for the translation;
      a management object (wfNatStaticMappingOrigPort) indicating an original port for the translation;
      a management object (wfNatStaticMappingTransPort) indicating a translated port for the translation;
      a management object (wfNatStaticMappingInDomain) indicating the inbound domain for the translation;
      a management object (wfNatStaticMappingOutDomain) indicating the outbound domain for the translation;
      a management object (wfNatStaticMappingStaticNextHop) indicating an address of a next hop for the translation entry; and
      a management object (wfNatStaticMappingUnnumCct) indicating whether the table entry is associated with an unnumbered interface.

42. A management information base for monitoring address translations in a multi-domain network address translator, the management information base comprising:
    a management object indicating an original address;
    a management object indicating a translation address for the original address;
    a management object indicating an inbound domain for multi-domain network address translation of the original address;
    a management object indicating an outbound domain for multi-domain network address translation of the original address; and
    wherein the management information base is operable to map a given local source address to a different one of a plurality of global addresses for each corresponding one of a plurality of destination address domains.

43. A management information base for monitoring address translation in a multi-domain network address translator, the management information base comprising:
    a management object indicating an original address;
    a management object indicating a translation address for the original address;
    a management object indicating an inbound domain for multi-domain network address translation of the original address;
    a management object indicating an outbound domain for multi-domain network address translation of the original address;
    a management object (wfNatMappingOrigAddress) an original (un-translated) address of the translation;
    a management object (wfNatMappingTransAddress) indicating a translated address of the translation;
    a management object (wfNatMappingProtocol) indicating a protocol of the translation;
    a management object (wfNatMappingOrigPort) indicating an original port for the translation;
    a management object (wfNatMappingTransPort) indicating a translated port for the translation;
    a management object (wfNatMappingTxCount) indicating a number of packets forwarded using the translation;
    a management object (wfNatMappingRxCount) indicating a number of packets received using the translation;
    a management object (wfNatMappingTimeout) indicating an amount of time since the translation was last used;
    a management object (wfNatMappingMode) indicating a source of the translation and a type of translation;
    a management object (wfNatMappingInDomain) indicating an inbound domain for the translation; and
    a management object (wfNatMappingOutDomain) indicating an outbound domain for the translation.

44. An apparatus for multi-domain network address translation, the apparatus comprising:

a management agent; and a management information base accessible through the management agent, wherein the management information base comprises:

a management object indicating an original address;

a management object indicating a translation address for the original address;

a management object indicating an inbound domain for multi-domain network address translation of the original address;

a management object indicating an outbound domain for multi-domain network address translation of the original address; and wherein the management information base is operable to map a given local source address to a different one of a plurality of global addresses for each corresponding one of a plurality of destination address domains.

45. An apparatus for multi-domain network address translation, the apparatus comprising:

a management agent; and a management information base accessible through the management agent, wherein the management information base comprises:

a management object indicating an original address;

a management object indicating a translation address for the original address;

a management object indicating an inbound domain for multi-domain network address translation of the original address;

a management object indicating an outbound domain for multi-domain network address translation of the original address;

a management object (wfNatMappingOrigAddress) an original (un-translated) address of the translation;

a management object (wfNatMappingTransAddress) indicating a translated address of the translation;

a management object (wfNatMappingProtocol) indicating a protocol of the translation;

a management object (wfNatMappingOrigPort) indicating an original port for the translation;

a management object (wfNatMappingTransPort) indicating a translated port for the translation;

a management object (wfNatMappingTxCount) indicating a number of packets forwarded using the translation;

a management object (wfNatMappingRxCount) indicating a number of packets received using the translation;

a management object (wfNatMappingTimeout) indicating an amount of time since the translation was last used;

a management object (wfNatMappingMode) indicating a source of the translation and a type of translation;

a management object (wfNatMappingInDomain) indicating an inbound domain for the translation; and a management object (wfNatMappingOutDomain) indicating an outbound domain for the translation.

* * * * *